(12) United States Patent
Stelling

(10) Patent No.: US 12,492,395 B2
(45) Date of Patent: *Dec. 9, 2025

(54) SOLID-CORE MAGNET

(71) Applicant: Alpaqua Engineering, LLC, Beverly, MA (US)

(72) Inventor: Olaf Stelling, Beverly Farms, MA (US)

(73) Assignee: Alpaqua Engineering, LLC, Beverly, MA (US)

( * ) Notice: Subject to any disclaimer, the term of this patent is extended or adjusted under 35 U.S.C. 154(b) by 1016 days.

This patent is subject to a terminal disclaimer.

(21) Appl. No.: 17/563,824

(22) Filed: Dec. 28, 2021

(65) Prior Publication Data

US 2022/0119800 A1 Apr. 21, 2022

Related U.S. Application Data

(63) Continuation of application No. 16/110,481, filed on Aug. 23, 2018, now abandoned.

(51) Int. Cl.
*C12N 15/10* (2006.01)
*B01L 3/00* (2006.01)
(Continued)

(52) U.S. Cl.
CPC ........ *C12N 15/1013* (2013.01); *B01L 3/5085* (2013.01); *B01L 9/523* (2013.01);
(Continued)

(58) Field of Classification Search
CPC .................... G01N 2035/0477; B01L 2400/04
See application file for complete search history.

(56) References Cited

U.S. PATENT DOCUMENTS 4,162,674 A 7/1979 Klein
5,186,827 A 2/1993 Liberti et al.
(Continued)

FOREIGN PATENT DOCUMENTS

DE 20 2014 102 945 U1 8/2014
EP 0589636 9/1993
(Continued)

OTHER PUBLICATIONS

International Search Report, PCT application No. PCT/US2022/040279, mailed Nov. 28, 2022, 13 pages.
(Continued)

*Primary Examiner* — Natalia Levkovich
(74) *Attorney, Agent, or Firm* — Antoinette G Giugliano; Antoinette G Giugliano PC

(57) ABSTRACT

A solid-core ring-magnet having one or more cavities is provided. The magnet can have an overall cylindrical shape or a rectangular-prism shape. In either case, a portion of cavity walls of the magnet are ring shaped, causing the magnetic field lines to emanate from the magnet so that the bead formation is in the shape of a ring. A bead separation magnet having a discontinuous or segmented cavity wall is also provided. The segmented cavity wall causes bead formation to form in a segmented or gapped ring to allow for easier manual pipetting. Also provided are systems and kits having the inventive magnets. Methods of purifying a macromolecule using the inventive magnets are also provided.

21 Claims, 21 Drawing Sheets

(51) Int. Cl.
  *B01L 9/00* (2006.01)
  *B03C 1/01* (2006.01)
  *B03C 1/033* (2006.01)
  *B03C 1/28* (2006.01)
  *B03C 1/30* (2006.01)
  *H01F 7/02* (2006.01)
  *G01N 35/00* (2006.01)

(52) U.S. Cl.
  CPC .............. *B03C 1/01* (2013.01); *B03C 1/0332* (2013.01); *B03C 1/0335* (2013.01); *B03C 1/288* (2013.01); *B03C 1/30* (2013.01); *H01F 7/02* (2013.01); *H01F 7/021* (2013.01); *B01L 3/50855* (2013.01); *B01L 2200/0668* (2013.01); *B01L 2300/0829* (2013.01); *B01L 2400/043* (2013.01); *B03C 2201/18* (2013.01); *B03C 2201/26* (2013.01); *G01N 35/0098* (2013.01)

(56) References Cited

U.S. PATENT DOCUMENTS

| | | | |
|---|---|---|---|
| 5,395,498 | A | 3/1995 | Gombinsky |
| 5,519,373 | A | 5/1996 | Miyata |
| 5,571,481 | A | 11/1996 | Powell et al. |
| 5,705,062 | A | 1/1998 | Knobel |
| 5,733,405 | A | 3/1998 | Taki |
| 5,733,442 | A | 3/1998 | Shukla |
| 5,795,470 | A | 8/1998 | Wang et al. |
| 6,255,478 | B1 | 7/2001 | Komai et al. |
| 6,451,189 | B2 | 9/2002 | Anderson |
| 6,610,186 | B1 | 8/2003 | Mayer |
| 6,755,384 | B2 | 6/2004 | Gorfain |
| 6,764,859 | B1 | 7/2004 | Kreuwel et al. |
| 6,870,047 | B2 | 3/2005 | Kleiber et al. |
| 7,384,559 | B2 | 6/2008 | a Brassard |
| 7,474,184 | B1 | 1/2009 | Humphries et al. |
| 7,551,051 | B2 | 6/2009 | Ugai et al. |
| 7,718,072 | B2 | 5/2010 | Safar et al. |
| 8,062,846 | B2 | 11/2011 | Bortolin et al. |
| 8,071,395 | B2 | 12/2011 | Davis et al. |
| 8,597,878 | B2 | 12/2013 | Hillebrand et al. |
| 8,658,042 | B2 | 2/2014 | Fasching |
| 8,703,931 | B2 | 4/2014 | Euting et al. |
| 9,140,634 | B1 | 9/2015 | Knippschild et al. |
| 9,416,399 | B2 | 8/2016 | Euting et al. |
| 9,663,780 | B2 | 5/2017 | Stelling |
| 10,087,438 | B2 | 10/2018 | Stelling |
| 10,208,303 | B2 | 2/2019 | Stelling |
| 11,400,460 | B2 | 8/2022 | Stelling |
| 2001/0014466 | A1 | 8/2001 | Lubenow et al. |
| 2002/0098121 | A1 | 7/2002 | Astle |
| 2004/0142384 | A1 | 7/2004 | Cohen et al. |
| 2005/0012586 | A1 | 1/2005 | Sutardja |
| 2005/0072674 | A1 | 4/2005 | Heins et al. |
| 2006/0055266 | A1 | 3/2006 | Iwami et al. |
| 2006/0158292 | A1 | 7/2006 | Ugai et al. |
| 2006/0207944 | A1 | 9/2006 | Siddiqi |
| 2007/0182517 | A1 | 8/2007 | Humphries et al. |
| 2007/0218566 | A1 | 9/2007 | Barten et al. |
| 2008/0171337 | A1 | 7/2008 | Miyazaki et al. |
| 2008/0199365 | A1 | 8/2008 | Chu |
| 2008/0206751 | A1 | 8/2008 | Squirrell et al. |
| 2010/0227387 | A1 | 9/2010 | Safar et al. |
| 2010/0311608 | A1 | 12/2010 | Osada et al. |
| 2013/0241686 | A1 | 9/2013 | Nakatsu |
| 2013/0344605 | A1 | 12/2013 | Hayden |
| 2014/0186236 | A1 | 7/2014 | Euting et al. |
| 2016/0108392 | A1* | 4/2016 | Stelling ............. C12N 15/1013 506/40 |
| 2016/0368001 | A1 | 12/2016 | Park |
| 2017/0226502 | A1 | 8/2017 | Stelling |
| 2017/0363569 | A1 | 12/2017 | Ivanov |
| 2018/0028990 | A1 | 2/2018 | Frodsham et al. |
| 2018/0362963 | A1 | 12/2018 | Stelling |
| 2018/0362964 | A1 | 12/2018 | Stelling |
| 2019/0160473 | A1 | 5/2019 | Stelling |
| 2020/0063118 | A1 | 2/2020 | Stelling |
| 2020/0181684 | A1 | 6/2020 | Tiedtke et al. |
| 2021/0180043 | A1 | 6/2021 | Carrese |

FOREIGN PATENT DOCUMENTS

| | | | |
|---|---|---|---|
| EP | 0 589 636 | A1 | 3/1994 |
| EP | 1404450 | B1 | 11/2005 |
| EP | 2082806 | A2 | 7/2009 |
| EP | 2 565 260 | A2 | 3/2013 |
| WO | WO 1996/15440 | | 5/1996 |
| WO | WO 2000/23807 | | 4/2000 |
| WO | WO 2003/044537 | A1 | 5/2003 |
| WO | WO2003090897 | | 11/2003 |
| WO | WO 2004077647 | | 9/2004 |
| WO | WO 2005/008209 | A2 | 1/2005 |
| WO | WO 2005/008861 | A1 | 1/2005 |
| WO | WO 2006/072593 | A2 | 7/2006 |
| WO | WO2009076560 | | 6/2009 |
| WO | WO 2014/007074 | A1 | 1/2014 |
| WO | WO2016061285 | | 4/2016 |
| WO | WO2019057345 | A1 | 3/2019 |
| WO | WO2020041339 | | 2/2020 |
| WO | WO2020041345 | | 2/2020 |

OTHER PUBLICATIONS

European Examination Report, Communication pursuant to Article 94(3) EPC, dated Dec. 12, 2023, 8 pages.
Direct Industry "Deep pot holding magnet BASN0110" Retrieved from internet http://www.directindustry.com/prod/ima/product-16882-1554759.html on Jun. 30, 2023.
Amazing Magnets "RD500B" Retrieved from internet https://amazingmagnets.com/product/rd500b/ on Jun. 30, 2023.
Amazing Magnets "Magnets and Supplies" http://www.amazingmagnets.com/parts.asp Aug. 12, 2002 retrieved from Internet Archive Wayback Machine http://web.archive.org/web/20020812212510/http:/www.amazingmagnets.com/parts.asp on Jun. 30, 2023.
Amazing Magnets "Product Features" http://www.amazingmagnets.com/products.asp?ID=01240 Nov. 2, 2004 retrieved from Internet Archive Wayback Machine http://web.archive.org/web/20041102173212/http:/www.amazingmagnets.com/products.asp?ID=01240 on Jun. 30, 2023.
Amazing Magnets "Browse Magnets by Shape>Rod>" http://www.amazingmagnets.com/index.asp?PageAction=VIEWCATS&Category=25597&Page=2. Nov. 2, 2006 retrieved from Internet Archive Wayback Machine http:/web.archive.org/web/20060307000528/http:/www.amazingmagnets.com/index.asp?PageAction=VIEWCATS&Category=25597&Page=2 on Jun. 30, 2023.
International Search Report for PCT PCT/US2015/0556112, mailed Jan. 14, 2016.
Written Opinion of the International Searching Authority for PCT PCT/US2015/0556112, mailed Jan. 14, 2016.
Communication pursuant to Article 94(3) EPC for EP Application No. 15790728.8, mailed May 15, 2018.
International Preliminary report on Patentability for PCT/US2015/0556112, mailed Apr. 27, 2017.
Schimp, Paul H "A Detailed Explanation of Solenoid Force" *Int. J. on Recent Trends in Engineering and Technology*, 8(2):7-14 (Jan. 2013).
International Search Report and Written Opinion, PCT application No. PCT/US2019/047310, mailed Oct. 9, 2019.
Brochure "Alpaqua Liquid Handling Products, MagPlate 24, 24-well Magnet Plate", Alpaqua Engineering, LLC, 100 Cummings Center, Suite 424A Beverly, MA 01915 (2011).
Brochure "Alpaqua Accelerating Genomic Discovery, MagPlate 24, 24-well Magnet Plate", Alpaqua Engineering, LLC, 100 Cummings Center, Suite 424A Beverly, MA 01915 (2011).
International Search Report and Written Opinion, PCT application No. PCT/US2019/047302, mailed Nov. 22, 2019.

(56) References Cited

OTHER PUBLICATIONS

International Preliminary Report on Patentability, PCT application No. PCT/US2019/047302, mailed Mar. 4, 2021.
International Preliminary Report on Patentability, PCT application No. PCT/US2019/047310, mailed Mar. 4, 2021.

* cited by examiner

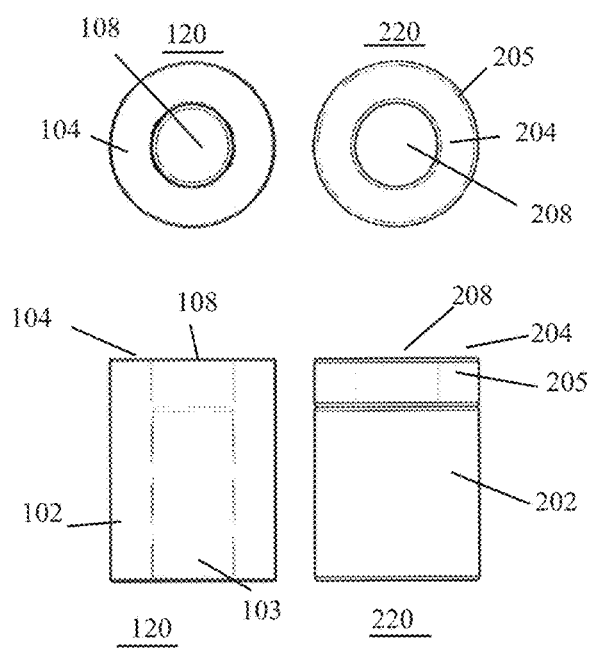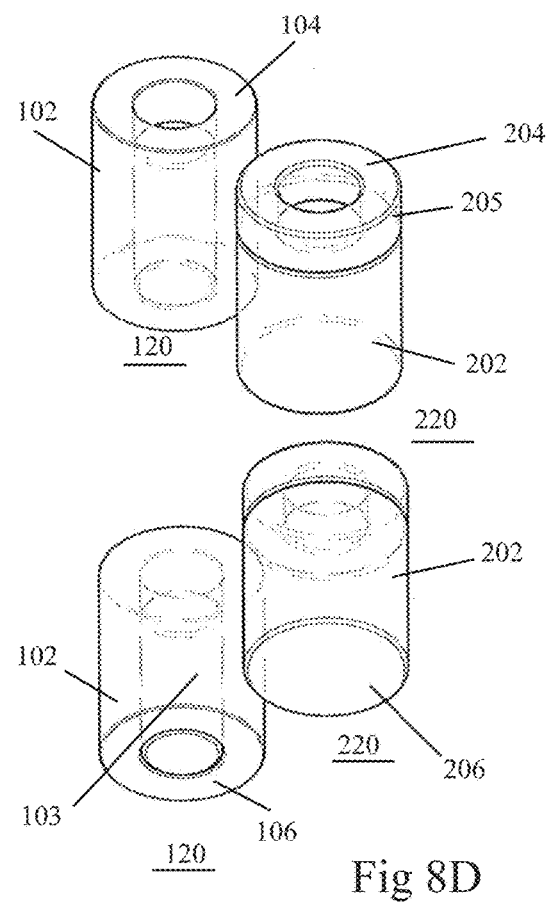

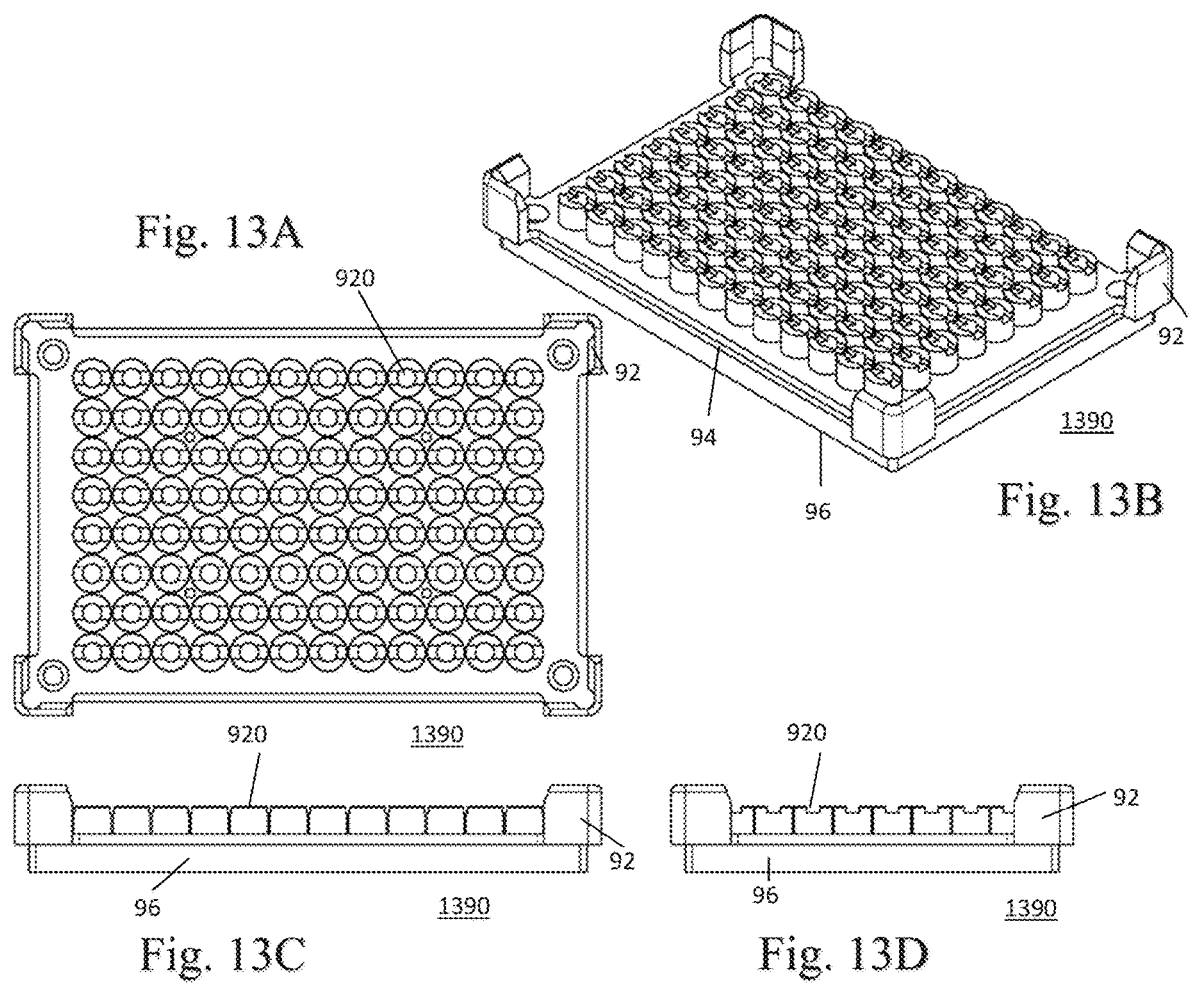

SOLID-CORE MAGNET

RELATED APPLICATION

This application is a continuation of U.S. application Ser. No. 16/110,481, entitled "Solid-Core Ring-Magnet" by Olaf Stelling, filed Aug. 23, 2018. The entire teachings of the above application are incorporated herein by reference.

BACKGROUND OF THE INVENTION

Isolation of macromolecules (e.g., nucleic acids, such as DNA or RNA, and proteins such as antibodies) is often required before they can be used in many applications. For example, sequencing of nucleic acids and restriction digestion of nucleic acids requires or at least benefits from their purification. Nucleic acids can be purified via a variety of methods, including the traditional phenol-chloroform extraction. A relatively modern method of purifying nucleic acids makes use of magnetic beads. In this approach, magnetic beads are coated with a substance to which nucleic acids have affinity under certain conditions, and from which nucleic acids can be separated under different conditions. Employment of magnetic beads in this manner can eliminate a need for centrifugation steps or vacuum filtration steps, which have traditionally been hard to automate. In addition, it can speed up the process, can increase the yields of recovery, and can allow recovery of nucleic acids directly from an initial sample. Magnetic beads can similarly be used for macromolecules other than nucleic acids; they can be used for proteins and complexes of two or more macromolecules.

Advances in sequencing technology have opened up new applications for magnetic bead technology. Where heretofore magnetic beads were mainly used to isolate nucleic acids from primary biological samples, their uses have expanded to those such as cleanup of enzymatic reactions during library construction (a process of preparing DNA for Next Generation Sequencing), or size selection (a process of limiting the bandwidth of DNA fragment sizes to a few hundred kilobases, e.g. 500 kb to 700 kb). The increased use of magnetic beads has prompted the need for magnetic bead kits having optimized efficiency and ease of use. In certain instances, the speed of separation, especially at higher reaction volumes, can directly affect the achievable throughput of a workflow, and accordingly a need exists for stronger, more efficient magnets. Additionally, other design considerations concern the volume of elution buffer needed to release the captured macromolecule from the bead complex; smaller volumes result in higher product concentrations, but at the same time pipetting often becomes more challenging, especially when the work is performed manually as opposed to using an automated pipettor. Hence, a need exists for an improved magnet that allows for easier manual pipetting. Lastly, a need further exists for a magnet design that accommodates a variety of sample containers commonly used in the lab. Therefore, there is a need for improved apparatuses and methods that can enable purification of macromolecules efficiently from a wide range of primary volumes into more concentrated solutions and within a wider variety of vessels.

SUMMARY OF THE INVENTION

Macromolecules, such as nucleic acids, can be separated or extracted via a variety of methods. In one method, complexes are formed between macromolecules and magnetic beads, and the magnetic beads are separated from a mixture, essentially purifying the macromolecules after their "un-complexation" or elution from the beads through changes in conditions. In an embodiment, the complex between the macromolecules and magnetic beads remains in the vessel aggregating to form of a pattern (e.g., a ring pattern, discontinued ring pattern, or other shaped pattern) and most of the solution is removed, leaving a high concentration of complex in the vessel.

In an embodiment, the present invention includes a magnet that can be used to isolate/purify macromolecules from a mixture. The mixture, as defined herein, is any aqueous solution that has at least the macromolecule in addition to the solvent. As an example, it can be extracellular matrix, cell debris, plasma, saliva, etc. The macromolecules, as defined here, encompass nucleic acids such as DNA or RNA, or proteins such as antibodies. The magnet, in particular, can be used to isolate macromolecules by making them adhere to magnetic beads, after which they can be separated from the mixture. In particular, through changes in the chemical environment macromolecules are made to adhere to the magnetic beads to form a complex. The magnet is then used to attract the complexes and pull them out of solution. In particular, the magnet of the present invention causes the complex to form an aggregation of bead complexes in a pattern within the vessel. The solution can then be removed leaving behind the magnetic beads with the macromolecules adhered thereto.

In an embodiment, the magnet encompassed by the present invention, in one aspect, has a top surface (a first surface) at one end (e.g., a first end), a bottom surface (e.g., a second surface) at another end (e.g., a second end), a solid core, and one or more cavities. In this embodiment, each cavity starts at one or more of the surfaces and goes toward the center of the magnet, but does not reach the other side, thereby leaving a solid core intact. In other words, for this embodiment, no tunnel from the top to bottom surfaces is formed and the magnet retains a solid core. One or more cavities extend into the solid core at or near the first end, the second end, or both; wherein the one or more cavities each have a cavity wall and at least a portion of the cavity wall forms a shape configured to receive the vessel. The magnet has a side wall, for example, that is not covered by the top and bottom surfaces and is in communication with the first end and the second end. In an embodiment of the present invention, the solid-core magnets of the present invention can be made from one or more pieces.

In an embodiment, the magnet has an overall cylindrical shape. In another embodiment, the magnet is shaped like a rectangular prism. In each of these, the cavities are formed. In embodiments, the cavities can have a "U" shape, "V" shape or other irregular shape so long as it can receive the vessel, as described herein. In a particular embodiment, the cavity wall of the inventive magnet has at least a top portion that is ring-shaped, and other portions if any, can be, for example, conus-shaped. In another embodiment, the cavity wall of the inventive magnet can have at least a top portion that has the shape of a ring, oval, square, rectangular, triangular, diamond, or has a shape that is irregular. The cavity wall has a shape that forms a magnetic field, when in use, within the vessel. The magnetic field, based on the shape of the cavity wall, causes the magnetic beads to aggregate in a pattern to allow for separation. In an embodiment, the cavity wall of the inventive magnet can have at least a top portion that has any shape so long as it can receive the vessel and, when in use, the magnetic field emanating from the shape allows the beads/macromolecule complex to aggregate in a pattern such that they can be separated from the mixture. The cavities are defined by their cavity walls. In an aspect, the cavity wall can include a base surface, which is the innermost part of the cavity wall that terminates the cavity. The cavity walls can have a constant diameter, or they can have varying diameters. In an embodiment, the base surface can be conically shaped; thus, it might have progressively decreasing radii toward the terminus of the cavity. The cavities receive vessels (e.g., Eppendorf tubes, wells of a microplate) which hold a solution. In certain embodiments, when the vessel is placed in the cavity of the inventive magnet, the volume of the portion of the solution that falls inside or within the cavity and up to the macromolecule/bead pattern, in an embodiment, is between about 5 and about 200 micro-liters (e.g., about 5, 10, 15, 20, 25, 30, 35, 40, 45, 50, 55, 60, 65, 70, 75, 80, 85, 90, 95, 100, 110, 120, 130, 140, 160, 180, and 200 microliters). In another embodiment, the volume of the cavity itself is between about 20 and about 250 microliters (e.g., between about 20, 25, 30, 35, 40, 45, 50, 55, 60, 65, 70, 75, 80, 85, 90, 95, 100, 110, 120, 130, 140, 160, 180, 200, 220, 240, and 250 microliters). The magnet volume enclosed between the first surface, the second surface, and the side wall forms a cylinder. In another embodiment, the magnet volume forms a prism.

In an embodiment, the magnet can be a single piece or made from more than one piece. In the case of the latter, a magnet in the shape of a ring placed on top of a solid cylindrical shaped magnet to form a magnet of the present invention with a solid core and at least one cavity that receives a vessel. In another example in which the magnet of the present invention can be of more than one piece, a hollowed cylinder can be used with a shorter, thinner solid cylinder in which the solid cylinder is placed within the hollowed one such that a cavity is formed.

In another embodiment, a system for isolating macromolecules is disclosed. In addition to the magnet, the system can include a vessel for holding a mixture that includes a macromolecule (e.g., DNA). The vessel is placed on the magnet or is shaped to fit on or within the one or more cavities. The same types of magnets as encompassed by other embodiments can be included as part of the system as well.

Also disclosed are methods of purifying macromolecules from a liquid sample that contains a mixture. The methods, in an embodiment, include steps of collecting the liquid in a vessel, adding magnetic beads to the sample (wherein these steps can be performed in any order under conditions to form a macromolecule-magnetic bead complex between the macromolecule and the magnetic bead), separating the magnetic bead-macromolecule complex from the sample by placing the vessel in a cavity of the magnet described herein, and removing the supernatant, followed by washing. After these steps, the macromolecule can be eluted from the magnetic beads.

In an embodiment, the present invention includes a kit. The kit can comprise a magnet, as described herein, and a vessel for holding liquid samples. In an embodiment, the vessel can be placed into or on top of a cavity of a magnet, and a volume of about 5 to about 200 microliters of sample would remain in the portion of the vessel that is within the magnet and up to the band. Magnetic beads and buffers can also be added as part of the kit in some embodiments.

Additionally, disclosed are magnet plate systems for isolating macromolecules. The systems include at least one magnet, as described herein, as well as a top plate, a support plate, and a base plate. One or more springs wound around one or more shoulder posts can also be included as part of the magnet plate systems. The top plate can include a plurality of magnet receivers, and it can accommodate either cylindrical shaped magnets or block shaped magnets.

In another embodiment, the magnet of the present invention can have a discontinuous or segmented cavity wall. At least a portion of the discontinuous cavity wall has one or more segments separated by one or more gaps. Accordingly, the magnet of the present invention includes a solid core having a first end 5, 905, 905B, 905C, 905D having a first surface, and a second end 7, 907, 907B, 907C, 907D having a second surface; one or more cavities extending into the solid core at or near the first end 5, 905, 905B, 905C, 905D, the second end 7, 907, 907B, 907C, 907D, or both; wherein the one or more cavities each have a cavity wall and at least a portion of the cavity wall having one or more segments and one or more gaps to form a discontinuous shape (e.g., discontinuous ring, oval, square, rectangular, triangular, diamond, or an irregular shape); and at least one side wall, wherein the side wall is in communication with the first end 5, 905, 905B, 905C, 905D and the second end 7, 907, 907B, 907C, 907D. In an embodiment, the cavity wall has one, two, three or four segments separated by one, two, three or four gaps, respectively, to form a discontinuous shape. In an aspect, the rest of the attributes of the solid-core magnet apply. Similarly, the inventive methods and systems, as described herein, include this discontinuous cavity wall magnet. In particular, the steps of the method using the discontinuous cavity wall magnet include collecting the liquid sample in a vessel; adding magnetic beads to the liquid sample under conditions to form a macromolecule-magnetic bead complex between the macromolecule and the magnetic bead; and separating the complex from the sample by placing the vessel on the magnet or in a cavity of a magnet. The bead complexes form a pattern in the vessel that mirror the segments and gaps in the cavity wall. The method further includes manually pipetting, which occurs at one or more gaps in the cavity wall, wherein the pipet is inserted into the vessel at a gap formed by macromolecule-magnetic bead complexes.

There are many advantages provided by the disclosed systems. Better yields of recovered macromolecules, faster recoveries, higher concentrations, and higher purities of recovered macromolecules are attainable as compared to magnets and systems previously available.

BRIEF DESCRIPTION OF THE DRAWINGS

The foregoing and other objects, features, and advantages of the invention will be apparent from the following more particular description of preferred embodiments of the invention, as illustrated in the accompanying drawings in which like parts are referred to by the same reference characters across different views. The drawings are not necessarily to scale, emphasis instead being placed on illustrating the principles of the invention.

FIG. 8A is a schematic of a side view of the magnet of the present invention in which the magnet is made from two or more pieces. The embodiment on the left is made from solid cylinder that fits within a hollow cylinder and the solid cylinder has a height that is less than the hollow cylinder to thereby create a cavity. The embodiment on the right is made from a cylinder and a ring that sits on top of the solid cylinder wherein the diameter of the solid cylinder and ring are about the same and the hollow volume of the ring creates the cavity.

FIG. 8B is a top view of the embodiments shown in FIG. 8A.

FIG. 8C is a top, perspective view of the embodiments shown in FIG. 8A.

FIG. 8D is a bottom, perspective view of the embodiments shown in FIG. 8A.

FIG. 13A is a schematic of a top view of a magnet plate having multiple discontinuous ring magnets shown in FIGS. 9A, 11A, and 12A.

FIG. 13B is a schematic of a perspective view of a magnet plate shown in FIG. 13A having multiple discontinuous ring magnets that each has a cylindrical shape.

FIG. 13C is a schematic of a side view of a magnet plate shown in FIG. 13A having multiple discontinuous ring magnets that each has a cylindrical shape.

FIG. 13D is a schematic of a front, profile view of a magnet plate shown in FIG. 13A having multiple discontinuous ring magnets that each has a cylindrical shape.

DETAILED DESCRIPTION OF THE INVENTION

Figure 1A:
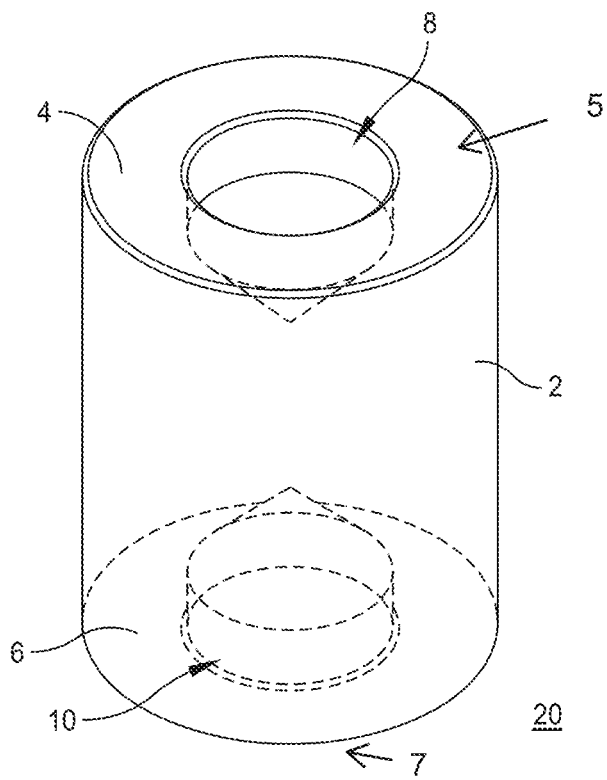
FIG. 1A is a schematic of a perspective view of a solid-core ring-magnet having a cylindrical shape and cylindrical/conical-shaped cavities.

A description of preferred embodiments of the invention follows.

In many molecular biology procedures, macromolecules are needed in a purified form. For example, to prepare a DNA or RNA sample for sequencing e.g., Next-Generation-Sequencing (NGS), it can be extracted from any of a variety of clinical sample types, such as tissue, blood, cheek swabs, sputum, forensic material, FFPE samples etc. For example, in certain NGS procedures, the initial extraction from the primary sample is followed by a multitude of enzymatic reactions called library construction. Each enzymatic reaction is followed by another extraction step to isolate conditioned nucleic acid from the reaction mix. The enzymatic reactions are typically followed by amplification (using PCR) and/or size selection (to limit the distribution of fragment sizes to a narrow band of a few hundred basepairs (e.g. 500-700 bp)). The workflow from primary sample to sequencing-ready DNA or RNA may involve from 5-10 separate extraction steps. Throughout the workflow, the overall volume of the mix containing the sample, as well as the sample container can vary significantly; typical volumes range from about 2000 µl to 35 µl. These workflows can be performed manually, or they can be automated to achieve increased throughput and potentially better repeatability. The automation of sequencing-related workflows has led to widespread adoption of magnetic bead technology for extraction purposes.

Depending on the nature of the macromolecule to be extracted as well as the matrix they are present in, magnetic beads (more precisely: paramagnetic beads) are coated with moieties (e.g., functional groups, other compounds) to which the macromolecules have affinity. Macromolecules include nucleic acids (e.g., DNA, RNA, PNA) and proteins (e.g., antibodies, peptides). Essentially, any macromolecule that can be made to adhere, reversibly or not, to magnetic beads can be subjected to the methods disclosed herein. For example, the beads might be coated with a carboxylic acid having moiety such as succinic acid. The coupling between the beads and the macromolecules might also rely on streptavidin-biotin or carbo di-imide chemistry. Exemplary coatings include protein A, protein B, specific antibodies, particular fragments of specific antibodies, streptavidin, nickel, and glutathione. The beads themselves can vary in size, but will have an average diameter (e.g., 1 micro-meter). In some embodiments, the paramagnetic properties of the beads will result from integration of iron into an otherwise non-magnetic substance (e.g., 4% agarose gel). Magnetic beads, as well as those that are already coated with various affinity groups, can be purchased from Sigma-Aldrich Corp. (St. Louis, MO, USA), Life Technologies (Now part of Thermo Fisher Scientific) (Grand Island, NY, USA), Thermo Scientific (Rockford, IL, USA), EMD-Millipore (Billerica, MA, USA), New England Biolabs (Ipswich, MA, USA), and GE Healthcare (High Wycombe, UK), Bangs Laboratories (Indianapolis, IN).

In one application of the methods of the present invention, molecules (e.g., macromolecules) can be purified using magnetic beads by performing the following steps:
 a. mixing the magnetic beads having a particular affinity-conferring functional group with the sample matrix containing the molecule of interest in a container (e.g., a vessel, an Eppendorf tube, a microplate well, a deep well, a PCR well, round-bottom vessel);
 b. after the mixing, allowing for specific binding between the beads and the molecules in conditions suitable therefor (e.g., by manipulating the conditions), thus creating bead-molecule complexes;
 c. placing the bottom of the vessel on or inside the cavity of a magnet of the present invention;
 d. allowing the bead-molecule complexes to aggregate (e.g., segregate) in a pattern around the inside perimeter of the vessel (or of each vessel if using multiple ones); and
 e. removing the supernatant, which would contain unbound, undesired components;
 f. performing one or more wash steps by adding a suitable solvent, e.g., ethanol, followed by removal of the same.

Additional steps can include re-suspending the bead-molecule complexes in a solvent, so as to obtain a solution with a desired volume and concentration. One can choose the appropriate solvent so that the binding affinity between the beads and the molecules is decreased, allowing them to dissociate from each other. Or one can repeat the steps above to aggregate the magnetic beads again to allow for additional separations, depending on the buffer chosen.

Also the beads may be used to either bind the component of interest, for example nucleic acid molecules, and during the method one discards the supernatant and elutes the component of interest from the beads. Alternatively, one can let the beads bind to a component that one is trying to discard, leaving only the component of interest in the supernatant. In this case, the supernatant is transferred to a new, clean vessel for use or further experimentation and the magnetic beads with their unwanted molecules are discarded.

The above methods can be performed manually or by using automated using robotic systems (e.g., automated liquid handling workstations) or aspirating/dispensing manifolds. Usable workstations for automation include Agilent Bravo, the Beckman Biomek i-series, Eppendorf epMotion, Hamilton Star, Tecan Fluent, and many others. The steps of the present invention can be done manually e.g., using pipetting to remove/collect the supernatant. When pipetting manually, the technician must take great care to avoid touching the ring of magnetic beads that has formed around the vessel bottom perimeter with the pipet tip, because such contact may cause a portion of the beads, along with their payload (i.e. the extracted macromolecules), to enter the pipet tip and subsequently be aspirated into the tip and discarded along with the supernatant. To avoid touching the beads, the pipet tip needs to be inserted perfectly straight and dead center into the vessel, which requires skill, practice, and dexterity. This task is simplified by the design of the magnet of the present invention having a discontinuous or segmented cavity wall as described herein. When magnetic beads are brought into the proximity of the magnet (by placing the vessel on top of the magnet), the beads will aggregate at the location of the highest magnetic field strength, which is generally at the closest distance from the magnet. If the magnet has a segmented wall, the magnetic beads will reflect that pattern and aggregate in a similarly segmented way, leaving one or more gaps in the vessel bottom perimeter. See FIG. 10B. This gap provides an opportunity for the technician to slide the pipet tip down along the vessel wall, thus using it as a guide, without disturbing the bead ring, because the pipet tip will slide through the opening in the bead ring that was created by the gap in the segmented magnet cavity wall. This way of pipetting greatly reduces the risk of accidentally disturbing the magnetic beads and the resulting bead loss.

Once a complex is formed between a macromolecule of interest and a magnetic bead (which might be formed via covalent as well as non-covalent bonds), a magnetic field created by a magnet can be employed to separate the bead-macromolecule complexes from the mixture (e.g., by forming one or more bands of beads in the vessel in close proximity to the magnet). After that, the supernatant can be aspirated (e.g., via pipetting) and the complexes washed (e.g., with ethanol) to further remove contaminants. In a subsequent step the macromolecules can be released from the beads, for example by eluting them via changes in the solution (e.g., buffer composition features such as pH and salt concentration). With currently known methods, this step results in large volumes of eluted macromolecules. The present invention surprisingly allows recovery of an eluate that is of lower volume, of a higher yield, and of a higher concentration per unit of time (e.g., rate of time or time measurement). The process of recovery also is sped up with the magnet of the present invention.

The magnet of the present invention, in one embodiment is made from a rare-earth metal such as neodymium. A neodymium magnet can have the chemical composition $Nd_2Fe_{14}B$, where Nd is neodymium, Fe is iron, and B is boron. In some alternative embodiments, the magnet can also be made from samarium (e.g., sintered $SmCo_5$). The magnet can be covered with a protective layer, for example a layer of nickel. Alternative coatings include one or multiple layers, such as nickel, copper, zinc, tin, silver, gold, epoxy resin, or any other suitable material. Such coatings help, among other things, with preventing rusting of the iron component. In each of these embodiments, the full object is referred to as the "magnet". The magnet can have a strength grade which for different embodiments can be about N35, N38, N40, N42, N45, N48, N50, or N52. Additional magnets with different grades, such as those with higher N-numbers (those that may be manufactured in the future) or different temperature ranges (H-grades), are also included among the embodiments of the present invention. The magnets (e.g., neodymium magnets) can be sintered or bonded. Magnets can be purchased from K&J Magnetics, Inc., Jamison, PA For example, the cavities can be molded or machined/drilled after sintering but before coating and magnetization.

In an embodiment, the magnet of the present invention can be used in an electromagnetic arrangement in which the magnet is created by use of a stainless steel or other ferromagnetic structure having a coil or solenoid wrapped around it. The solenoid produces a magnetic field when an electric current is passed through it. This configuration can be used to form the magnet and system of the present invention. This arrangement and others known in the art, or developed in the future, can be used to create the magnet system of the present invention.

In one embodiment, shown in FIG. 1A, magnet 20 has two cavities, top cavity 8 (e.g., a first cavity) and bottom cavity 10 (e.g., a second cavity). Top cavity 8 descends from the center of top surface 4 (e.g., a first surface), while bottom cavity 10 rises from bottom surface 6 (e.g., a second surface). The sides of magnet 20 are surrounded by side wall 2. In the embodiment shown in FIG. 1A, both the magnet is cylindrical and a portion of the cavity wall is cylindrical-shaped. In one aspect, the cavities have walls that are in part cylindrical-shaped and in part conical shaped. In an embodiment, the cavity wall can be any shape so long as a portion of the cavity wall has a shape to form a magnet field that attracts the beads in a formation or pattern within the vessel that allows the molecule-bead complexes to be easily separated from the mixture. In another embodiment, the cavity wall of the inventive magnet can have at least a top portion that has the shape of a ring, oval, square, rectangular, triangular, diamond, or has a shape that is irregular. The cavity wall has a shape that forms a magnetic field, when in use, within the vessel. The magnetic field, based on the shape of the cavity wall, causes the bead to form in a pattern that mirrors the cavity wall shape to allow for separation. In an embodiment, the cavity wall of the inventive magnet can have at least a top portion that has any shape so long as it can receive the vessel and, when in use, the magnetic force emanating from the shape allows the beads/macromolecule complex to aggregate in a pattern such that such that the liquid phase (supernatant) can be removed without disturbing the bead/macromolecule complex or otherwise separated from the mixture. The term "cylindrical-shaped," in this document, is used to refer to three-dimensional structures that have sections that have ring-like (circular) outer boundaries. The term "cylindrical/conical-shaped," refers to a cavity that has both features and in particular, has three-dimensional structures that have sections that have ring-like (circular) outer boundaries and a section of the base that is conical. The axes of the cylindrical sections, as defined, are parallel to the axis of thickness (i.e., between the top surface and the bottom surface planes) of the structure. Additionally, sections that are elliptical to a slight degree (e.g., the two radii differing by less than 5%) are also encompassed in the shape of the cavity. The cavity can be of any shape so long as it can receive a vessel such that, when in use, the magnetic field causes the magnetic beads to form a pattern within the vessel that allows for bead separation.

The overall structure, for magnet 20, is cylindrical when the presence of cavities is ignored. In other words, the volume enclosed inside of the outside wall, bound above by the plane of the top surface (e.g., top plane), and bound below by the plane of the bottom surface (e.g., bottom plane) is cylinder-shaped. When referring to volumes, the terms top surface and bottom surface are used to mean the plane of the top surface and the plane of the bottom surface, respectively.

For clarification, there are two pertinent volumes with respect to the cavities of the magnet of the present invention, in an embodiment. The volume of the cavity itself, and the volume of solution in the vessel that, when placed into the magnet, resides generally within the cavity (i.e., between the top plane and the lowest point of the cavity wall), or put another way, from the lowest point of the cavity wall up to the bead formation. In one embodiment, the volume of the cavity itself is between about 5 and about 250 microliters (e.g., between about 20, 25, 30, 35, 40, 45, 50, 55, 60, 65, 70, 75, 80, 85, 90, 95, 100, 110, 120, 130, 140, 160, 180, 200, 220, 240, and 250 microliters). In another embodiment, the cavity has a size such that the volume of the solution in the vessel and that which lies within the cavity up to the bead formation, in an embodiment, is between about 5 and about 200 microliters (e.g., about 5, 10, 15, 20, 25, 30, 35, 40, 45, 50, 55, 60, 65, 70, 75, 80, 85, 90, 95, 100, 110, 120, 130, 140, 160, 180, and 200 microliters). The latter also refers to the volume needed in the vessel to cover the macromolecule-bead ring so as to elute the beads from the macromolecules or to perform some other experiment. Note that a space exists between the cavity wall and the vessel placed within the cavity, and so a difference in volume exists between the cavity size and the volume of solution in the vessel and within the top plane. In the embodiment shown in FIG. 1A, two cavities are shown. However, one cavity can be used, in an embodiment, since it creates a place for the vessel to be received. However, two cavities, in another embodiment, are desired so that the magnets can be inserted during assembly in either orientation, i.e., polarity. Accordingly, the present invention involves a magnet with one or more cavities (e.g., two, three, four, five, six, seven, eight, nine, or ten, etc.).

Figure 1B:
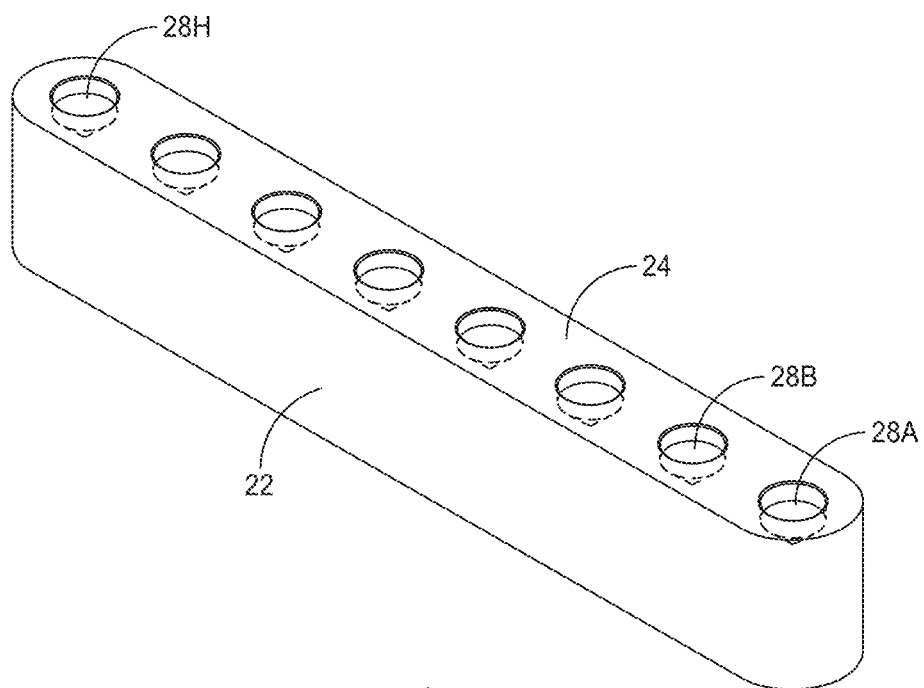
FIG. 1B is a schematic of a perspective view of a solid-core ring-magnet having multiple cylindrical/conical-shaped cavities and an overall rectangular-prism shape.

In other embodiments, while the cavity wall has a portion that is cylindrical shaped, the overall magnet can be a block, shaped as a bar, or a prism (e.g., rectangular-prism shaped). One such embodiment is shown in FIG. 1B. Shown are side wall 22, top surface 24, and top cavities (28A, 28B . . . 28H) of magnet 40. Magnet 40 is generally a bar magnet with curved ends and a number of cavities, whereas magnet 20 is a cylindrical magnet with two cavities. With respect to the applications of the magnets, the focus is on the cavity as opposed to the full magnet. Therefore, both the cylindrical magnet (e.g., magnet 20) and the block magnet (e.g., magnet 40) are considered and referred to as solid core magnets because regardless of the shape of the magnet that has cavities, the core is a solid filled magnet. In defining "solid core ring magnet," the word "ring" of the phrase "solid core ring magnet" connotes the shape of the top portion of the cavity wall or the ring of the paramagnetic bead/macromolecule complex that it forms. The term "solid core magnet" in this document refers to magnets that have a solid core and a cavity wall with at least a portion being shaped to allow for separation of beads in the vessel.

Figure 2A:
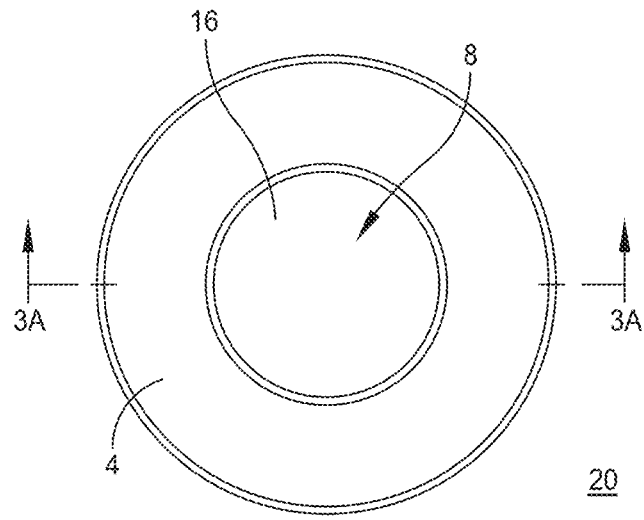
FIG. 2A is a schematic of a top view of a solid-core ring-magnet having a cylindrical shape.

FIG. 2A shows a top view of the magnet shown in FIG. 1A. Visible are top surface 4, top cavity 8, as well as base surface 16 of the top cavity. From this figure, it is apparent that the cavity wall is ring/conical-shaped. A cutout view as generated through the markings "3A" is shown in FIG. 3A.

Figure 2B:
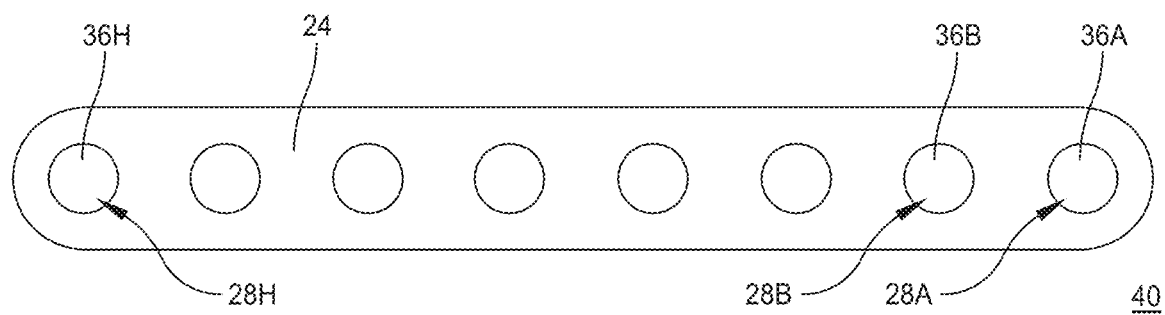
FIG. 2B is a schematic of a top view of a solid-core ring-magnet having multiple cylindrical/conical-shaped cavities and an overall rectangular-prism shape.

FIG. 2B shows a top view of the magnet shown in FIG. 1B. Shown magnet 40 is a block magnet, and has eight cavities. Shown in this figure are top surface 24, top cavities (28A, 28B . . . 28H), and base surfaces (36A, 36B . . . 36H) of the top cavities. Even though the outer boundary of this block magnet is shaped like a rectangular prism, this magnet is also classified herein as a solid core ring-magnet because the cavity walls are ring/conical-shaped.

Figure 3A:
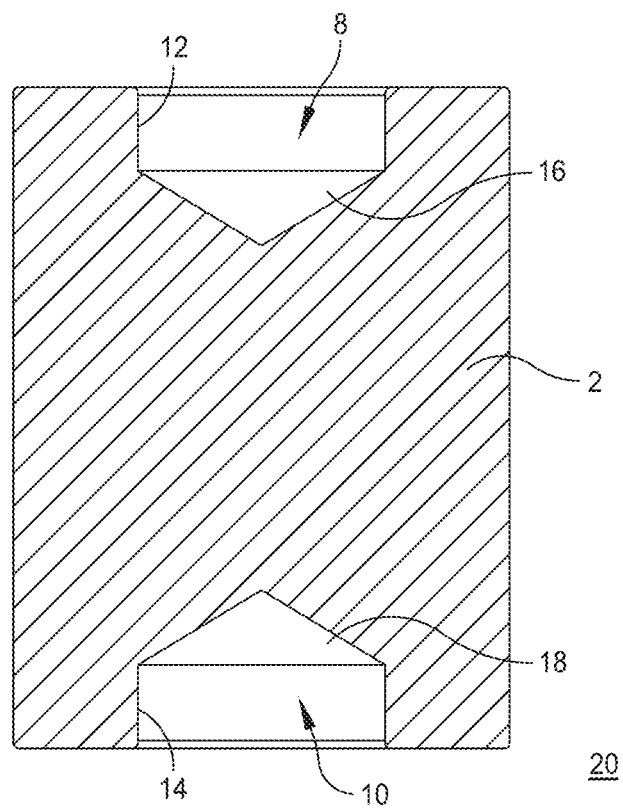
FIG. 3A is a schematic of a cut-out side view, as defined in FIG. 2A, of a solid-core ring-magnet having a cylindrical shape.

A cross section of the magnet previously introduced in FIG. 2A is shown in FIG. 3A. Magnet 20 shown in this figure has top cavity 8 and bottom cavity 10. The portion of top cavity 8 that descends from top surface 4 toward the middle of the top cavity has a top ring shaped wall 12 and a top conical surface wall 16. The conical surface wall 16 is the portion of the cavity wall that has radii decreasing from that of the upper parts of the cavity wall to lower values until the cavity ends. Similarly shown are bottom cavity with bottom ring shaped wall 14 and bottom cavity conical surface 18. The shape of the cavity does not need to include a conical shape, and can be any shape ("V" shaped, "U" shaped or irregular shape) so long as it can receive the vessel, as described herein. The top and bottom cavities, or their portions such as the walls and surfaces, need not be the same as each other. However, having them the same makes it easier to assemble them on a guide plate as well as making substitution of a magnet with another one easy. For embodiments that have identically shaped top and bottom cavities, a decision during the assembly of the magnets on a guide plate as to whether they have the same or opposite polarity can be made by simply holding a random end of each of two magnets against each other. If they attract, they are oppositely polarized. If they repel, they share the same polarization.

Figure 3B:
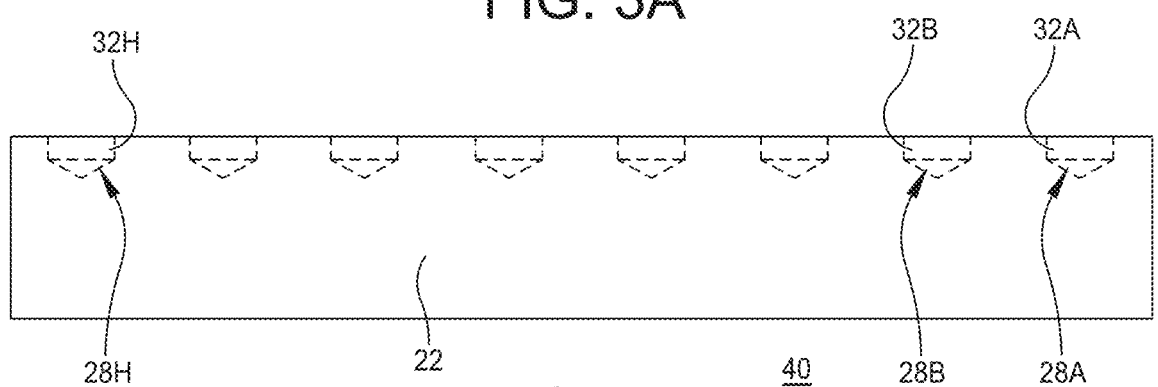
FIG. 3B is a schematic of a long-side view of a solid-core ring-magnet having multiple cylindrical/conical-shaped cavities and an overall rectangular-prism shape.
Figure 3C:
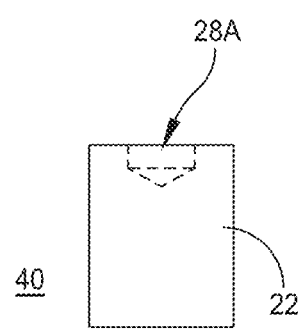
FIG. 3C is a schematic of a short-side view of a solid-core ring-magnet having multiple cylindrical/conical-shaped cavities and an overall rectangular-prism shape.

A side view showing the long side of block magnet 40 is shown in FIG. 3B. This figure shows side wall 22, top cavities (28A, 28B . . . 28H), and top cavity walls (32A, 32B . . . 32H). FIG. 3C shows the same magnet, but from the viewpoint of the short side.

Figure 4A:
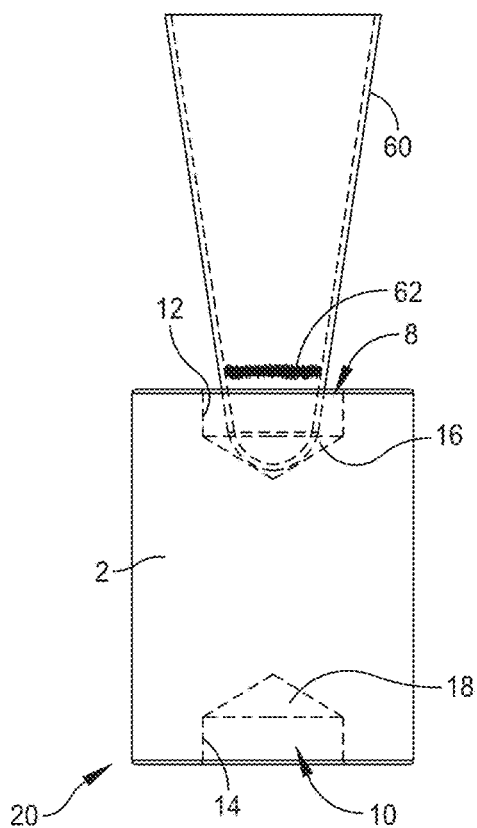
FIG. 4A is a schematic of a side view of a solid-core ring-magnet having a cylindrical shape, further showing two cavities and a V-shaped vessel for holding a reaction mixture of magnetic beads and macromolecules. The ring of complex between the magnetic beads and macromolecules just above the top of the magnet is shown.
Figure 4B:
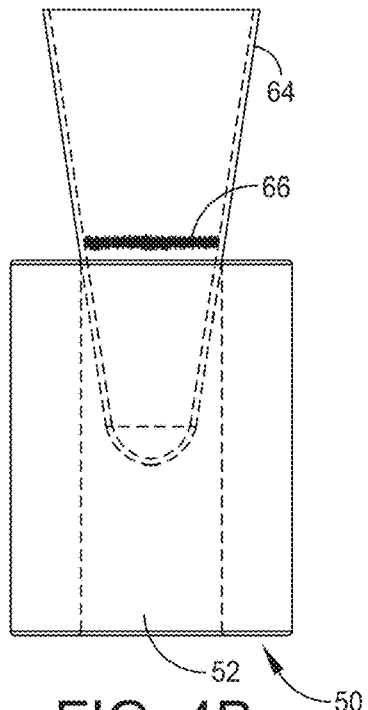
FIG. 4B is a schematic of a side view of a standard ring magnet having one full-length channel, and a V-shaped vessel for reaction mixture of magnetic beads and macromolecules. The ring of complex between the magnetic beads and macromolecules just above the top of the magnet is shown.
Figure 4C:
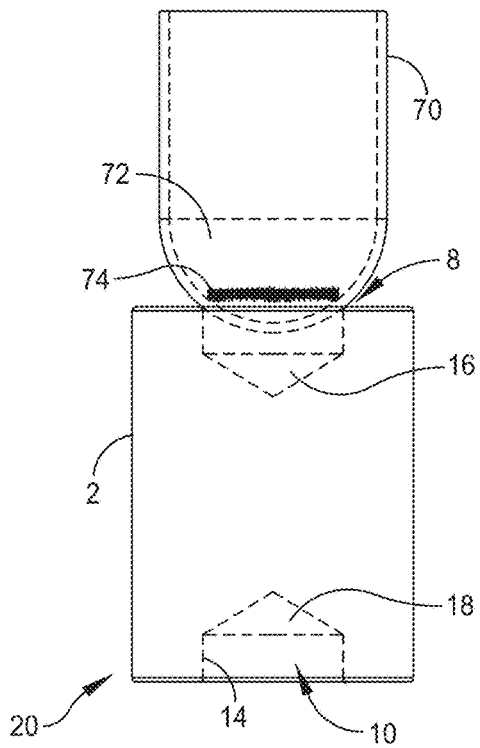
FIG. 4C is a schematic of a side view of a solid-core ring-magnet having a cylindrical shape, further showing two cavities and a U-shaped vessel for reaction mixture of magnetic beads and macromolecules. The ring of complex between the magnetic beads and macromolecules just above the top of the magnet is shown.
Figure 4D:
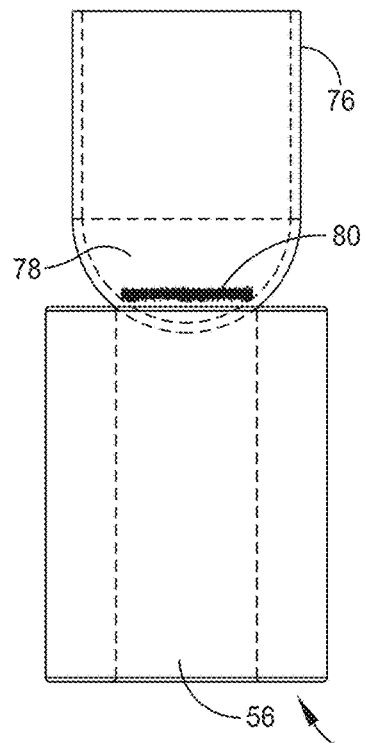
FIG. 4D is a schematic of a side view of a standard ring magnet having one full-length channel and a U-shaped vessel for reaction mixture of magnetic beads and macromolecules. The ring of complex between the magnetic beads and macromolecules just above the top of the magnet is shown.

A comparison between a previously available magnet (referred to as a "standard ring magnet") and the solid-core magnets of the present invention is shown in FIG. 4A through FIG. 4D. As should be immediately apparent, the standard ring magnet has a channel that runs through the entire thickness between the top and bottom ends of the magnet (FIG. 4B and FIG. 4D). In contrast, the solid-core magnet of the present invention, as the name implies, has a solid core and one or more cavities that do not create a channel/tunnel through the entire thickness of the magnet (FIG. 4A and FIG. 4C). Each of the cavities shown in FIG. 4A and FIG. 4C terminates with a conical surface. In this embodiment, a conical surface allows accommodation of a vessel that has a V-shaped bottom tip, whereas the diameter of the cavity above the conical surface allows accommodation of a vessel that has a U-shaped bottom tip. In contrast, while a standard magnet would lead to a high volume of sample being underneath the aligned level of the macromolecule, a solid-core magnet would allow a low volume of sample being underneath the aligned level of the macromolecule/bead complex. Nucleic acid/bead band 62 aggregates at a lower position in vessel 60 when using the solid core magnet of the present invention (See FIG. 4A), as compared to the position of the nucleic acid/bead band 66 in vessels 64 using the standard ring magnet (See FIG. 4B). A lower position in the well is desirable since less elution buffer is generally needed to elute the DNA, leading to a higher DNA concentration.

The terms U-shaped vessel, vessel with a U-shaped bottom tip, and round bottom shaped well are used interchangeable. The terms V-shaped vessel, vessel with a V-shaped bottom tip, and conical shaped well are also used interchangeably.

Overall, FIGS. 4A and 4C show conical shaped vessel 60 having a V-shaped bottom tip, nucleic acid/bead complex band 62, round shaped vessel 70, nucleic acid solution 72, and nucleic acid band 74. For comparison, FIGS. 4B and 4D show standard ring magnet 50 having standard channel/tunnel 52, which is used for V-shaped vessel 64 to isolate nucleic acid 66, and standard ring magnet 54 having standard channel 56, which is used for U-shaped vessel 76 to isolate nucleic acid 80 from solution 78. As can be seen in the figures, the standard ring magnet of FIG. 4B causes the nucleic acid/bead complex to sit higher in the vessel, as compared to the nucleic acid/bead complex shown in FIG. 4A. Accordingly, less elution buffer is needed when using the solid core ring magnet of the present invention.

Additionally, FIGS. 4A and 4C show that the solid core magnet of the present invention is universal with respect to the type of vessel being used. It can be used with a "V" shaped vessels such as a PCR plate or a "U" shaped vessel such as a deep-well plate. Since either vessel shape can be used, the solid core magnet plate can be used to perform several experiments or purification steps without having to switch to another magnet plate having a different size/shaped magnet.

Even though the macromolecule is specifically a nucleic acid (e.g., DNA, RNA, PNA) in these figures, also included in other embodiments are other macromolecules such as proteins (e.g., antibodies, peptides). Essentially, any macromolecule that can be made to adhere, reversibly or not, to magnetic beads can be subjected to the methods disclosed herein.

Figure 4E:
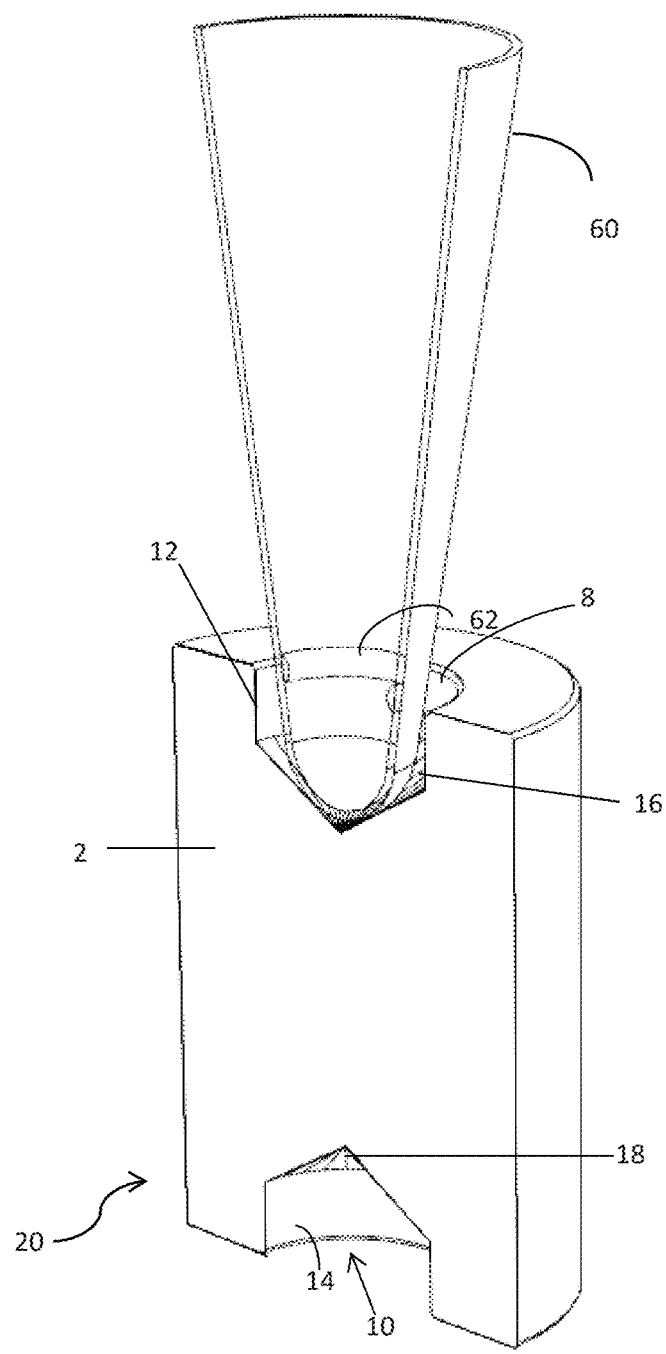
FIG. 4E is a schematic of a perspective view of a of a solid-core ring-magnet having a cylindrical shape, further showing two cavities and a V-shaped vessel for holding a reaction mixture of magnetic beads and macromolecules shown in FIG. 4A. The ring or band of macromolecule/bead complex just above the top of the magnet is shown.
Figure 4F:
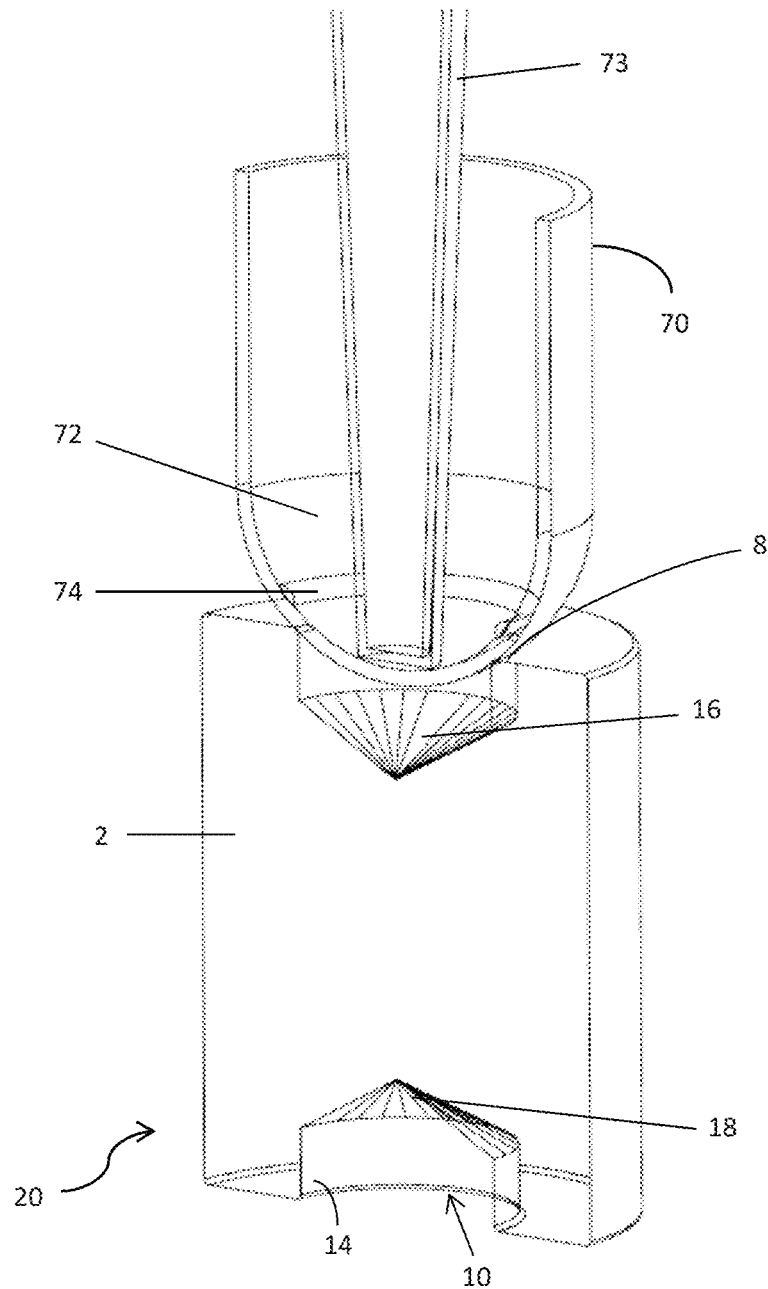
FIG. 4F is a schematic of a perspective view of a of a solid-core ring-magnet having a cylindrical shape, further showing two cavities and a U-shaped vessel for holding a reaction mixture of magnetic beads and macromolecules shown in FIG. 4B. The ring or band of macromolecule/bead complex just above the top of the magnet is shown and also a pipette is shown.

Now turning to FIGS. 4E and 4F, the formation of the nucleic acid/bead complex can be seen. FIG. 4E is a cross-sectional view of FIG. 4A and FIG. 4F is a cross-sectional view of FIG. 4C. FIG. 4E shows the aggregation of the nucleic acid/bead band 62 and FIG. 4F shows the aggregation of nucleic acid/bead band 74. As can be seen from this drawing, the solid core magnet having a ring-shaped cavity wall forms a band that is also a ring formation along the inner wall of vessels 60 or 70. The formation of the nucleic acid/bead band in a ring shape is a function of the magnetic fields mirrored in this case by the ring-shaped cavity wall of the solid core magnet, which are further described herein. Since a ring is formed along the inner vessel wall, pipetting the supernatant out (for example using pipette 73), whether in an automated fashion or manually, can be performed and allows one to leave the bead band in the vessel. As further described herein, the cavity wall can be other shapes, other than a ring/cylindrical shaped, and the bead pattern mirrors the shape of the cavity wall. For example, it can be a discontinuous ring formed by one or more segments and gaps, in which case the bead pattern also forms a discontinuous ring (see FIG. 10).

The location of the macromolecule band impacts the steps of the methodology for separating the macromolecules from the mixture. When the vessel is placed on the magnet, the magnetic beads in the solution aggregate near the magnet at the place of the highest concentration of the magnetic field lines; this is where the magnetic field is generally the strongest. The shape or pattern of the bead formation mirrors the shape of the upper portion of the cavity wall and the bead formation generally forms in the bottom of the vessel, near the top of the magnet. The shape of the cavity wall can be chosen based on the separation needs of the user (e.g., manual pipetting, automated pipetting, size of pipettes, volume of mixture, etc.). After discarding the supernatant and washing the immobilized beads with a wash solution, the next step is intended to recover the macromolecules from the beads. This is accomplished by exposing the beads to elution buffer, which will reverse the adherence between the macromolecules and the beads. The purified macromolecules are then present in the elution buffer, which can subsequently be removed from the vessel by aspiration. To effectively elute the macromolecules from the beads, one can add enough elution buffer to completely cover the beads with buffer, so that effective elution can take place. Because it is desirable to keep the elution volume as small as possible (to achieve a higher concentration of eluate) while ensuring complete coverage of the beads by the elution buffer, the magnet of the present invention was designed to aggregate the magnetic beads very low near the bottom of the vessel, regardless of the vessel shape.

Figure 5A:
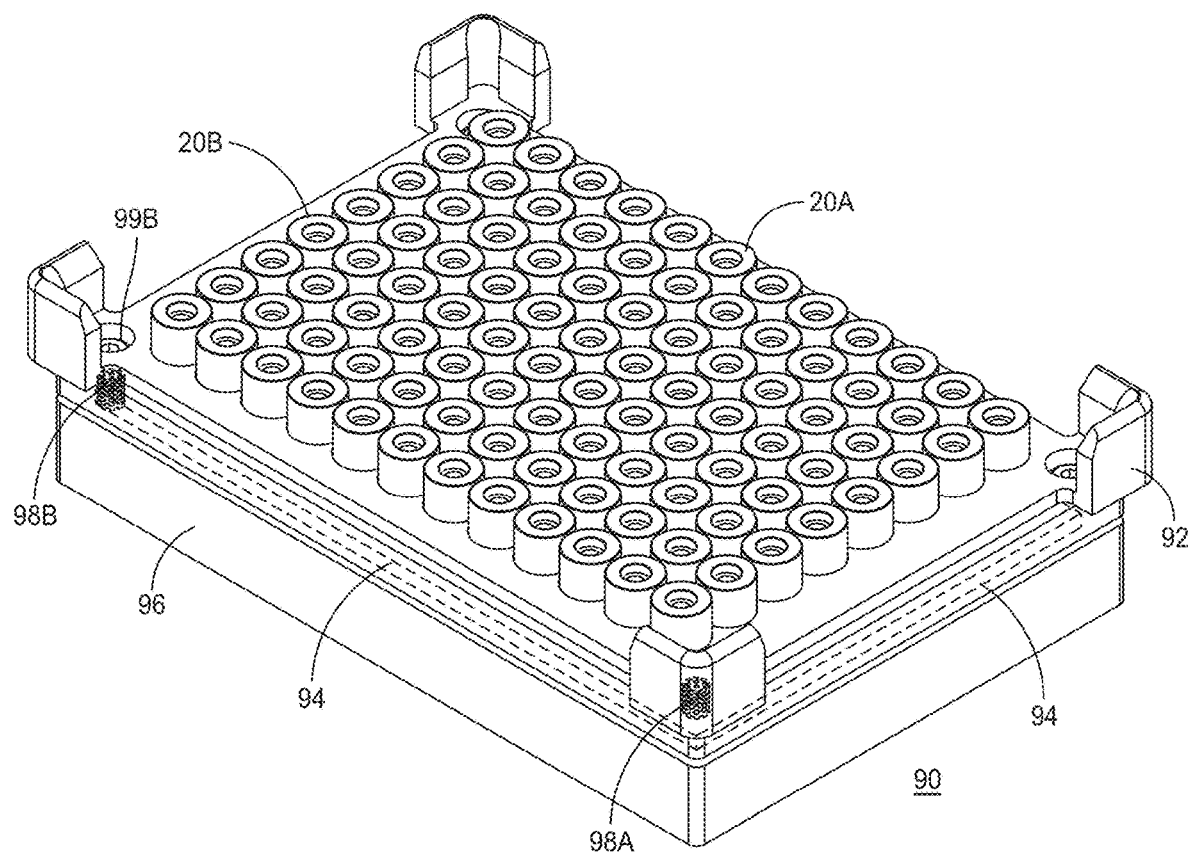
FIG. 5A is a schematic of a perspective view of a magnet plate having multiple solid-core ring-magnets that each has a cylindrical shape.

Magnetic fields are often visualized using lines. Magnetic field lines are imaginary, but they are helpful tools that illustrate the shape and outline of a magnetic field. In such illustrations the lines emanate from one pole of the magnet and re-enter the magnet at the other pole, thus forming a closed loop. The relative strength of the magnetic field at a given location is shown by varying the density of the lines, with higher densities depicting stronger magnetic fields. The magnetic field is strongest at the magnetic poles. The location of the poles on a particular magnetic shape is determined during manufacturing, when the magnetic material is magnetized. In the present invention, the direction of the magnetization is perpendicular to the surface(s) with the cavities, in other words, along the axis of the cavities. In particular, the magnets disclosed herein are magnetized through the thickness (i.e., along the center axis running between the top surface plane and the bottom surface plane). Each cavity is surrounded by a top surface and a bottom surface, and each such side (top surface and bottom surface) has a certain polarity, which can be designated as north (N) or south (S). When the magnets having an overall cylindrical shape are assembled on a guide plate (an example of which is shown in FIG. 5A), they can be arranged in any number of arrangements including alternating rows, alternating columns, checkerboard arrangement or other pattern. Arrangements of polarities are embodied for any top plates that might have a different number of magnet receivers to accommodate various size plates (e.g., 6, 24, 96, 384 or even 1536 sample wells arranged in a 2:3 ratio rectangular matrix).

Because the shape of the solid-core-magnet is different than that of a standard ring-magnet with a channel/tunnel running through the entire thickness of the magnet, the magnetic field lines created are different. In the solid-core magnet, the magnetic lines result in stronger pull forces because of the increased amount of magnetic material. Experimental support for this is provided in the exemplification section, Experiment 1 and in FIG. 6. Stronger pull forces facilitate quicker recovery of material, and also facilitate recovery of higher yields of material. See Experiment 2, FIG. 7.

FIG. 5A shows magnet plate 90, within which there is top plate 92 (also referred to as guide plate) that has 96 magnet receivers (i.e., the holes not shown in the figure, which receive the magnets). The magnet receivers are arranged along 8 rows and 12 columns. Each magnet receiver receives a magnet (e.g., 20A, 20B). Springs (98A, 98B, etc.) are placed around shoulder posts (99B, etc.) at the corners of the top plate. The shoulder posts, and the springs, pass through top plate 92 and base plate 96. The springs allow flexibility in the leveling of the magnets, and thus any vessels placed in their cavities. With the springs, pipetting from the vessels can be accomplished more efficiently. In an embodiment, support plate 94 is a metal, and an affinity exists between the support plate and the magnets. Further underneath, below both the top plate and the support plate, is base plate 96. The top plate can be fastened to the base plate by inserting shoulder posts (e.g., bolts) through the shoulder bolt receivers found at the corners of the two plates. In some embodiments, the shoulder bolts and the springs can be on each of the four corners of the plates, whereas in other embodiments they can be in alternative locations (e.g., along portions of the edges or on some of the corners only). The support plate is made from a material that has affinity to magnets. It can be made from a metal such as iron, nickel, cobalt, or an alloy of different materials (e.g., stainless steel).

Figure 5B:
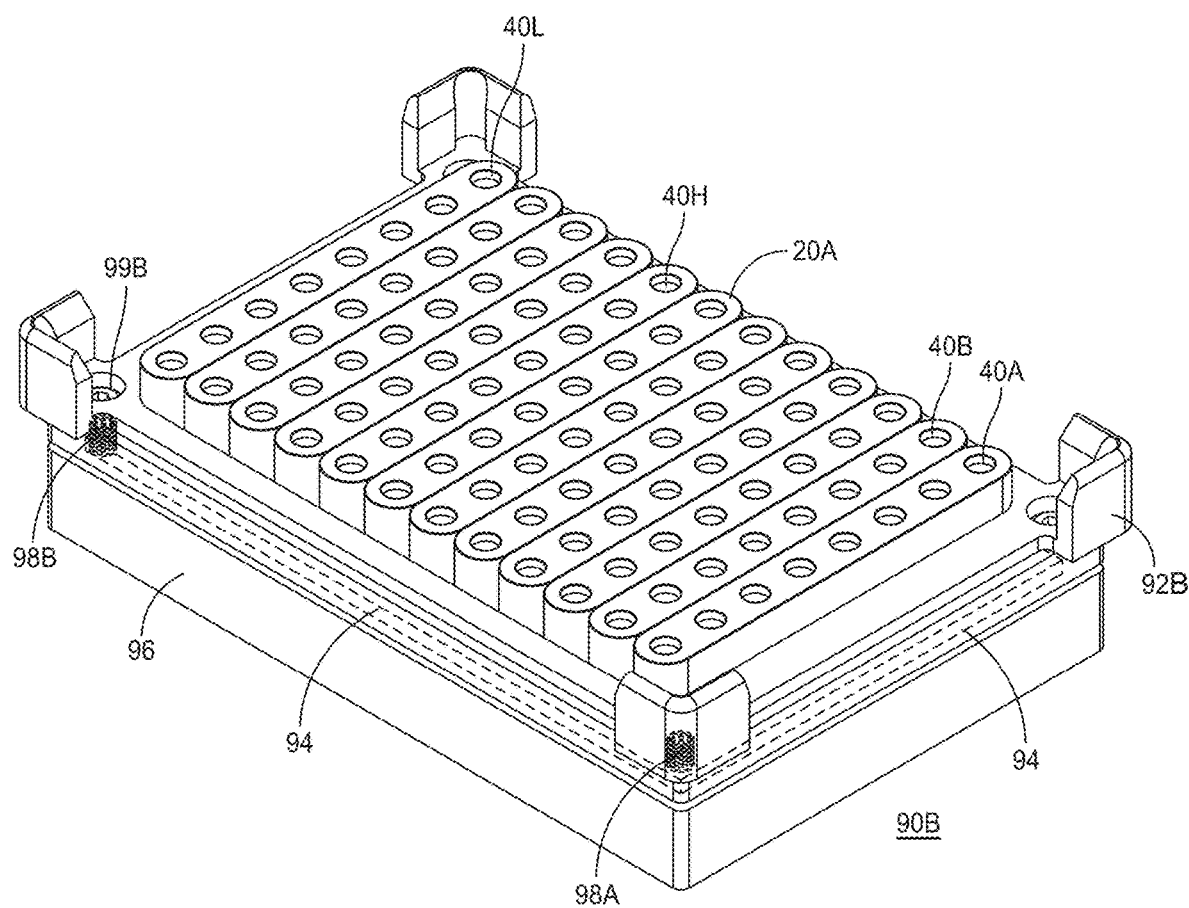
FIG. 5B is a schematic of a perspective view of a magnet plate having multiple solid-core ring-magnets that each has multiple cylindrical/conical-shaped cavities and an overall rectangular-prism shape.

In a similar fashion to FIG. 5A, FIG. 5B shows a magnet plate. In this embodiment, the magnets are block shaped. Similar elements, such as the three plates (top, support, base), springs, and shoulder posts are usable with this embodiment. While not necessary, in the embodiment shown, all components except the magnets and the top plate are the same as in FIG. 5A.

The integrated spring components enable complete liquid removal without tip occlusion. The springs effectively cushion the wells, and allow the plates (e.g., top plate, support plate) to give way when tips (e.g., pipette tips) come in contact with a well bottom. This compensates for physical tolerances between labware and pipettors, each of which can otherwise compromise the precision of supernatant removal (e.g., aspiration). In addition, in some embodiments the magnet plates are designed for automation; they have a standardized footprint to fit into standard liquid handler plate nests, plate hotels, and stackers. Gripper grooves on the long sides provide space for robotic arms or grippers when moving microplates onto and off the magnet plates.

As described herein, the magnet of the present invention can be a single piece, as shown in FIG. 1A, or comprise two or more pieces, as shown in FIG. 8. In FIG. 8, two examples are shown in which the magnet of the present invention has two or more pieces. Referring to FIG. 8A, the embodiment on the left shows a hollow cylinder and shorter solid cylinder in which the solid cylinder fits within the inner volume of the hollow cylinder to form a magnet having a solid core. Similarly, the embodiment on the right shows a solid cylinder having a diameter and a ring having the same or similar diameter (e.g., the ring diameter is 100%, 99%, 98%, 97%, 96%, 95%, 94%, 93%, 92%, 91%, 90% of the solid cylinder diameter) sitting on top of the solid cylinder to form a magnet having a solid core. Both embodiments are encompassed by the present invention, as is any embodiment that includes two or more pieces that together form the magnet of the present invention. FIG. 8B shows a top view in which the magnets look the same. The top perspective view of FIG. 8C and the bottom perspective view of FIG. 8D show how the pieces fit together (e.g., that in one embodiment the solid cylinder fits within the hollow cylinder or a ring that sits on a solid cylinder).

More specifically, shown in FIG. 8A, magnet 120 has a top cavity 108, formed by the differences in height between solid cylinder 103 and the hollow cylinder 102. Hollow cylinder 102 has a height, an inner opening and volume defined by inner walls, and solid cylinder 103 has a height that is less than the height of hollow cylinder 102 and solid cylinder 103 that has a volume (e.g., a volume slightly less than the inner volume defined by inner walls of hollow cylinder 102) and shape that complements the inner opening of hollow cylinder 102 or otherwise allows it to fit within hollow cylinder 102. The differences in height between solid cylinder 103 and hollow cylinder 102 creates top cavity 108, which descends from the center of top surface 104 (FIGS. 8B and 8C). Bottom surface 106 (FIG. 8D) includes the bottom surface of both solid cylinder 103 and hollow cylinder 102. The sides of magnet 120 have side walls 102 that are formed by hollow cylinder 102.

Similarly, as shown in FIG. 8A, magnet 220 has a top cavity 208, formed by ring 205 having a diameter that sits on solid cylinder 202 having the same or similar diameter. Top surface 204 is the top surface of ring 205. Top cavity 208 is formed by the top surface of solid cylinder 202 and the inner walls of ring 205. Bottom surface 206 (FIG. 8D) is the bottom surface of solid cylinder 202. In another embodiment a ring can also be placed at the bottom of solid cylinder 202 to create a bottom cavity as well, similar to that of the top cavity. The sides of magnet 220 have sides that are formed by solid cylinder 202. In the embodiments shown in FIG. 8A, both the magnet is cylindrical and at least a portion or all of the cavity wall is cylindrical-shaped. The pieces of the magnet can be made or commercially purchased (e.g., Amazing Magnets, LLC (Anaheim, CA, 92807 USA) or K&J Magnetics, Inc. (Pipersville, PA, USA).

The present invention also includes improvements to the embodiments shown in FIGS. 1-8. The basis of the improvement shown in FIG. 9-13 is that the magnet of the present invention has a discontinuous cavity wall instead of a solid ring shape, such that, when in use, the magnetic field causes the magnetic beads to form a ring but the ring is discontinuous or has gaps. The discontinuous shape having one or more gaps corresponds to the bead pattern formation having one or more gaps in the vessel and provides an opening for insertion of a pipette. FIGS. 10A and 10B show where the paramagnetic beads aggregate, and this occurs because the shape of the magnetic field changed based on the discontinuous ring shape of the magnet. In FIG. 10A, as performed using a solid core ring magnet shown in FIGS. 1-8, the paramagnetic beads form a ring shaped that coincides with the shape of the cavity wall. In FIG. 10B, performed with the discontinuous ring magnet shown in FIG. 9, the paramagnetic beads for a discontinuous or gapped ring shape that mirrors the shape of the cavity wall of the discontinuous ring. Both the embodiments, the solid core ring magnet and the discontinuous ring magnet, achieve efficient separation but the discontinuous ring magnet is better suited for manual pipetting. The discontinuous ring allows for a human hand to insert a pipette into the vessel along the side of the vessel or at an angle, and through an opening/gap on the side as compared to inserting direct from above.

Figure 9A:
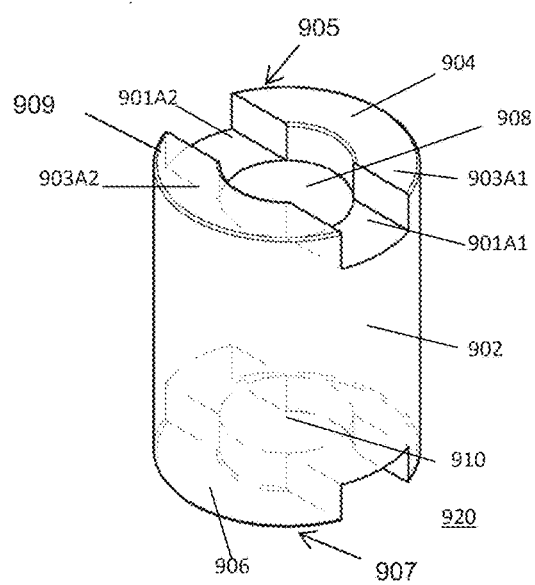
FIG. 9A is a schematic of a perspective view of a solid core magnet having a discontinuous ring comprising two segments and two gaps.
Figure 10A:
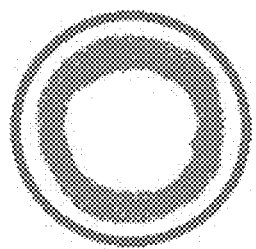
FIG. 10A is a schematic of the formation of macromolecules and paramagnetic beads created by a solid core ring magnet of the present invention.
Figure 10B:
FIG. 10B is a schematic of the formation of macromolecules and paramagnetic beads created by a discontinuous ring magnet of the present invention as shown in FIGS. 9A, 11A, 12A, and 13A-D.

More specifically, shown in FIG. 9A, magnet 920 has two cavities, top cavity 908 and bottom cavity 910. Top cavity 908 descends from the center of top surface 904 (e.g., a first surface), while bottom cavity 910 rises from bottom surface 906 (e.g., a second surface). The shape of the cavity for magnets having a solid core has already been described herein, and can be conical shape, but also can be any shape ("V" shaped, "U" shaped or irregular shape) so long as it can receive the vessel, as described herein. The sides of magnet 920 are surrounded by side wall 902. In the embodiment shown in FIG. 9A, both the magnet is cylindrical and at least a portion 909, 909B, 909C, 909D of the cavity wall is cylindrical-shaped. The cavities have walls that are in part cylindrical-shaped and in part conical shaped. The cylindrical-shaped portion 909, 909B, 909C, 909D of the discontinuous cavity wall has gaps 901A1 and 901A2 and segments 903A1 and 903A2 such that it forms a discontinuous ring shape. In an embodiment, the cavity wall can be any shape so long as a portion 909, 909B, 909C, 909D of the cavity wall is discontinuous or segmented (e.g., a discontinuous or segmented ring shape) to form a magnet field that attracts the beads in a discontinuous pattern formation within the vessel. The phrase "discontinuous" or "segmented" is used to refer to at least a portion 909, 909B, 909C, 909D of the cavity wall that have one or more segments (e.g., one, two, three or four segments) along with one or more gaps, breaks, slots, recesses or the like (e.g., one, two, three or four gaps, respectively). The cavities of this embodiment have a "discontinuous ring/conical-shaped," which refers to a cavity that has both features and in particular, has three-dimensional structures that have sections that have discontinuous ring-like outer boundaries and a section of the base that is conical. In an embodiment, the shape of the cavity walls does not need to be a ring shape. The cavity wall of the inventive magnet can have at least a top portion that has a discontinuous or segmented shape of a ring, oval, square, rectangular, triangular, diamond, or has a shape that is irregular. The cavity wall has a shape that forms a magnetic field, when in use, within the vessel. The magnetic field, based on the shape of the discontinuous or segmented cavity wall, causes the beads to form in a pattern that mirrors the cavity wall shape to allow for separation. In an embodiment, the discontinuous cavity wall of the inventive magnet can have at least a top portion that has any shape so long as it can receive the vessel and, when in use, the magnetic force emanating from the shape allows the beads/macromolecule complex to aggregate in a pattern such that they can be separated from the mixture.

Figure 9B:
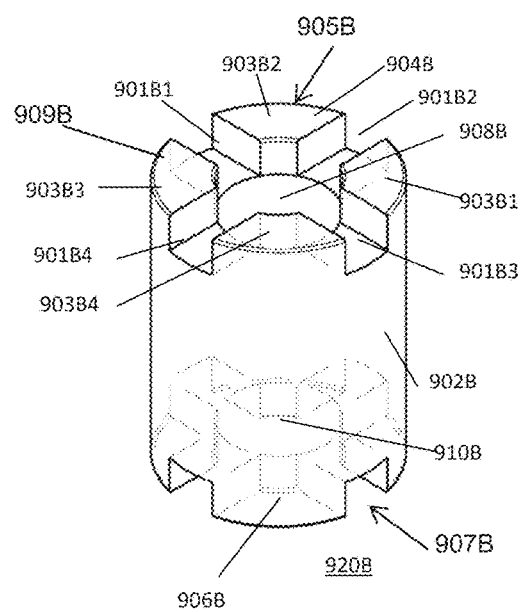
FIG. 9B is a schematic of a perspective view of a solid core magnet having a discontinuous ring comprising four segments and four gaps.
Figure 9C:
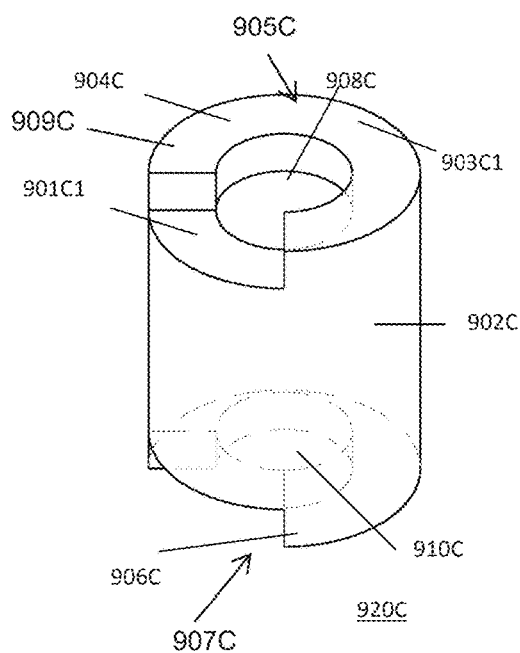
FIG. 9C and FIG. 9D are schematics of a perspective view of a solid core magnet having a discontinuous ring comprising one segment and one gap.
Figure 9D:
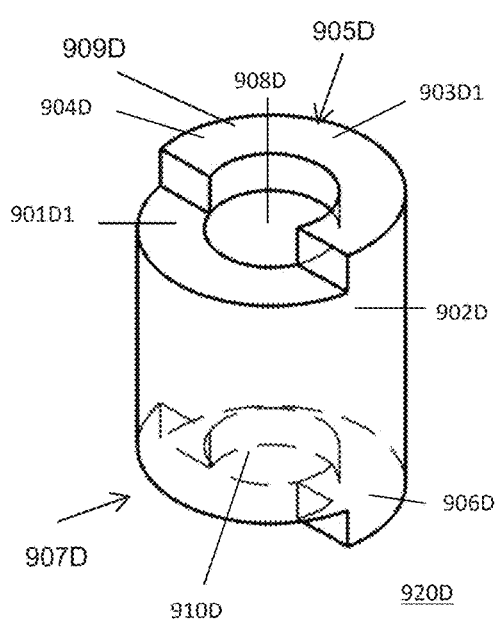

In FIG. 9A, the cavity wall of discontinuous ring of magnet 920 is formed by two segments and two gaps. FIGS. 9B-9E show several variations of the discontinuous ring. FIG. 9B shows four segments, 903B1-B4, and four gaps 901B1-B4, whereas FIGS. 9C and 9D has one segment, segment 903C1 or 903D1, respectively, and one gap, gap 901C1 or gap 901D1, respectively. In each instance, the bead formation mirrors the segments of the discontinuous cavity wall. In the case of magnet 920B, four partial circular bead formations occur and in the case of magnet 920C or 920D one partial circular bead formation occurs which extends along or about half or 180° to about two thirds or 270° (e.g., 50%, 55%, 60%, 65%, 67%, 70%, 75%, or 80%) of the circumference of the cavity wall. In particular, magnets 920B, 920C and 920D each have two cavities, top cavity 908B, 908C, and 908D, respectively, and bottom cavity 910B, 910C, and 910D, respectively. Top cavities 908B, 908C, and 908D descend from the center of top surface 904B, 904C, and 904D, respectively, while bottom cavities 910B, 910C, and 910D rise from bottom surfaces 906B, 906C, 906D respectively. The sides of magnets 920B, 920C and 920D have side walls 902B, 902C, and 902D, respectively.

The embodiments shown in FIGS. 9A-9D each have a solid core. As described herein, in general, the solid core provides more magnetic material, resulting in a stronger magnetic field to obtain more efficient separation of the paramagnetic beads. Magnets having a discontinuous or segmented cavity wall are useful for manual pipetting to provide a slot or gap at which a pipet can be inserted into the vessel at a gap in the paramagnetic bead formation pattern. The slot allows for a person to access the liquid in the vessel at an angle using the cavity wall as a guide and sliding the pipet tip through the gap or slot in the aggregated paramagnetic beads towards the bottom of the vessel without disturbing the beads.

Figure 11A:
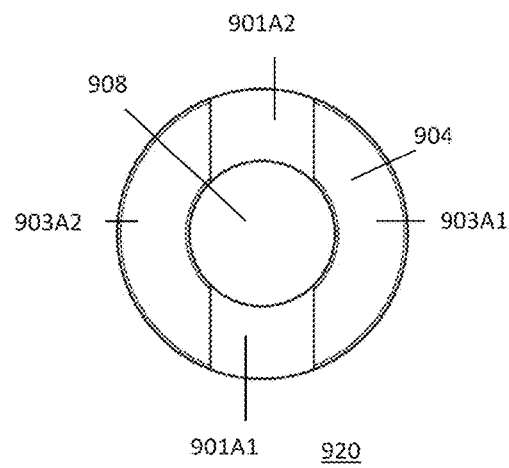
FIG. 11A is a schematic of a top view of the solid core magnet shown in FIG. 9A having a discontinuous ring comprising two segments and two gaps.
Figure 11B:
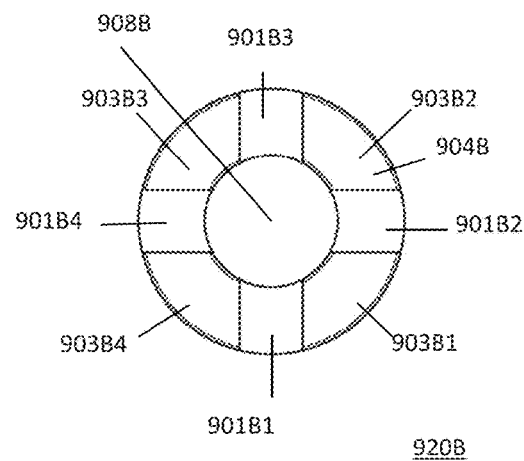
FIG. 11B is a schematic of a top view of a solid core magnet shown in FIG. 9B having a discontinuous ring comprising four segments and four gaps.
Figure 11C:
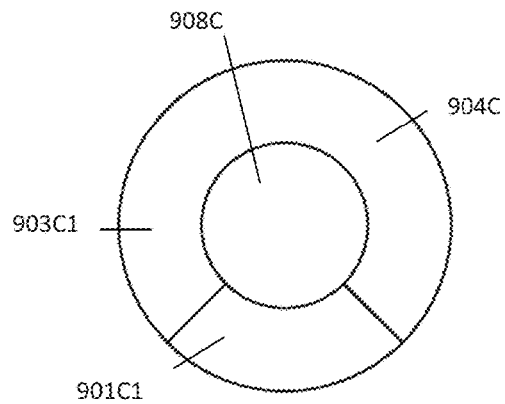
FIGS. 11C and 11D are schematics of a top view of a solid core magnet shown in FIGS. 9C and 9D, respectively, having a discontinuous ring comprising one segment and one gap.
Figure 11D:
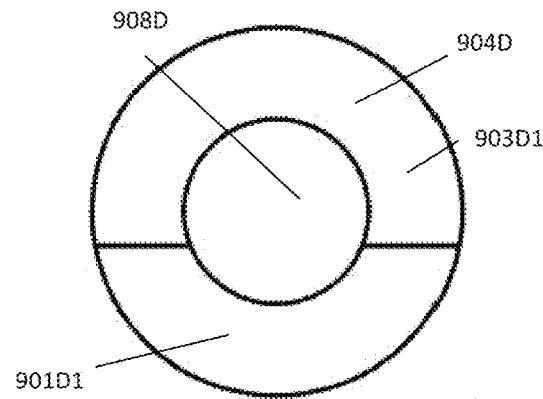

Referring to FIGS. 11A-D, the figure shows the top view of the magnets shown in FIG. 9A-D, respectively. FIG. 11A shows the top view of the discontinuous solid core magnet 920 having two segments (903A1 and 903A2) and two gaps (901A1 and 901A2). Similarly, FIGS. 11B, 11C and 11D show the top view magnets 920B, 920C and 920D having a four segment/gap arrangement (e.g., 903B1, 903B2, 903B3, 903B4 segments and 901B1, 901B2, 901B3, 901B4 gaps) and a one segment/one gap arrangement (903C1 or 903D1 segment and 901C1 or 901D1 gap).

Figure 12A:
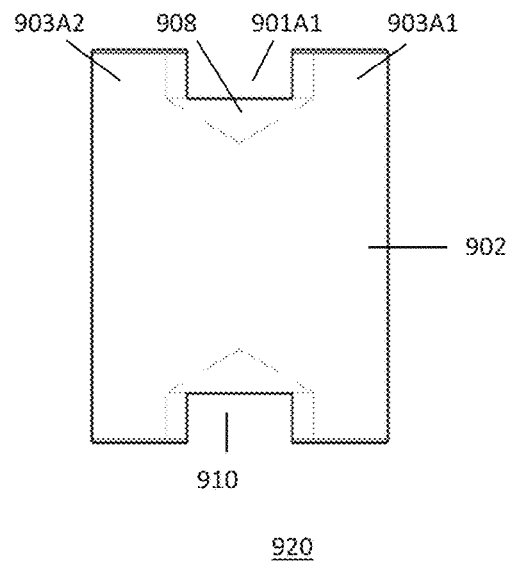
FIG. 12A is a schematic of a side view of the solid core magnet shown in FIG. 9A having a discontinuous ring comprising two segments and two gaps.
Figure 12B:
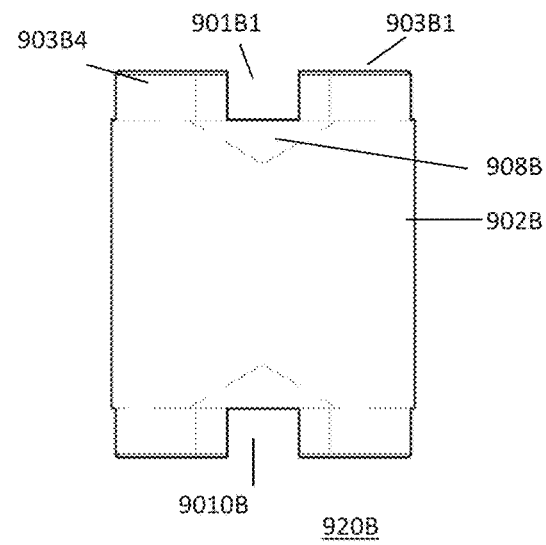
FIG. 12B is a schematic of a side view of a solid core magnet shown in FIG. 9B having a discontinuous ring comprising four segments and four gaps.
Figure 12C:
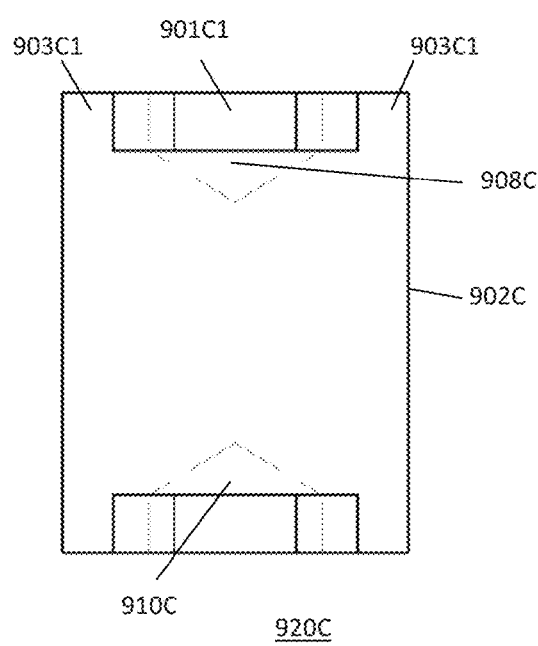
FIG. 12C and FIG. 12D are schematics of a side view of a solid core magnet shown in FIG. 9C and FIG. 9D having a discontinuous ring comprising one segment and one gap.
Figure 12D:
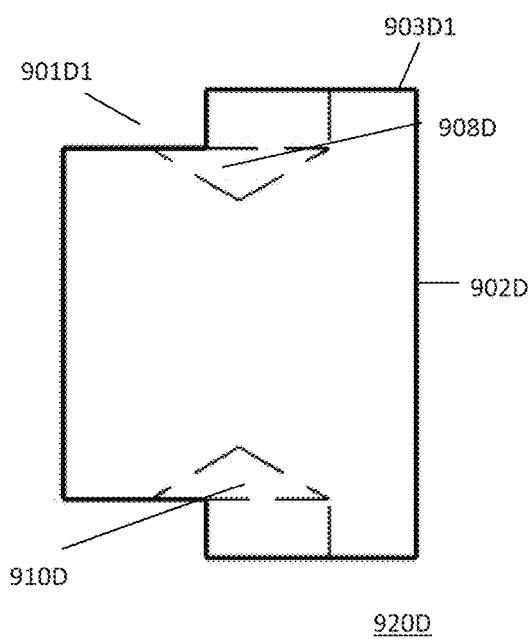

FIGS. 12A-D show a side view of the magnets shown in FIG. 9A-D, respectively. FIG. 12A shows the side view of the discontinuous solid core magnet 920 having side wall 902, two segments (903A1 and 903A2) and two gaps (901A1 and 901A2 (not shown)) and cavities 908 and 910. Similarly, FIGS. 12B, 12C and 12D show the side view of magnets 920B, 920C and 920D having side walls 902B, 902C, 902D, cavities 908B, 908C, 908D (top) and 910B, 910D, and 910D (bottom), a four segment/gap arrangement (e.g., 903B1, 903B2 (not shown), 903B3 (not shown), 903B4 segments and 901B1, 901B2 (not shown), 901B3 (not shown), 901B4 (not shown) gaps) and a one segment/one gap arrangement (903C1 or 903D1 segment and 901C1 or 901D1 gap), respectively.

As with solid core magnets, while the cavity wall has a portion that is cylindrical shaped, the overall magnet can be block-shaped, a bar, or a prism (e.g., rectangular-prism shaped), as described herein. Briefly, the overall block shape (or other shape) can have gaps milled, etched, molded, 3D printed, or otherwise inserted into the ring (or other shape) to create the discontinuous cavity wall magnet of the present invention. The block magnet can include a plurality of cavities having discontinuous or segmented cavity walls. With respect to the applications of the magnets, the focus is on the cavity as opposed to the full magnet. For example, both the discontinuous cavity wall magnets and the block magnet having a number of discontinuous cavity walls are referred to as discontinuous ring magnets, discontinuous cavity wall magnets or discontinuous magnets because regardless of the shape of the overall magnet that has cavities with a discontinuous cavity wall.

FIG. 13A shows magnet plate 1390, within which there is top plate 92 (also referred to as guide plate) that has 96 magnet receivers (i.e., the holes/openings that receive the magnets not shown in the figure). The plate is the same as that shown in FIG. 5 except that the magnets differ. Support plate 94 and base plate 96 are also shown in FIG. 13. The magnet receivers are arranged along 8 rows and 12 columns. Each magnet receiver receives a magnet, and in the case of FIG. 13, magnet 920. All other parts of the magnet plate remain the same. In a similar fashion to FIG. 13B, FIGS. 13C and 13D show a perspective view, side view and front view of magnet plate 1390. The magnet plates can utilize a plurality of single magnets or block magnets.

In general, the magnets of the present invention, when used for isolating macromolecules, allows quicker recovery of the macromolecules, recovery of higher percentages, and recovery of the macromolecules in smaller elution volumes. The magnet of the present invention, as described in the example, provides for better separation of the beads from the mixture. This is accomplished because the design of the magnet provides additional force that is applied to the magnetic beads. In an embodiment, the magnet of the present invention provides between about 1% and about 25% (e.g., about 20%, 15%, 10%, and 5%) additional magnetic force, as compared to the standard ring magnet. See FIG. 6. The additional force provides for better, more efficient separation. Accordingly, in an embodiment, the magnet of the present invention has a recovery of the macromolecules between about 40% to about 99% (e.g., about 45%, 50%, 60%, 65%, 70%, 75%, 80%, 85%, 90%, and 95%) recovery. As compared to a standard ring magnet, in certain embodiments, the magnet of the present invention improves recovery by about 1% to about 60% (e.g., about 5%, 10%, 15%, 20%, 25%, 30%, 35%, 40%, 45%, 50%, and 55%).

Specifically, the magnet of the present invention is able to separate more nucleic acid material in a given time period, i.e. it is able to do so faster and in fewer cycles, as compared to the standard ring magnet. In an embodiment, the magnet of present invention is able to separate macromolecules that can adhere to magnetic beads in an amount that is about 1× faster and up to about 4.5× faster, (1×, 1.5×, 2×, 2.5×, 3×, 3.5×, 4×, 4.5×), as compared to a non-solid core magnet (e.g., a standard ring magnet as shown in FIGS. 4B and 4D). Experimental support for these improved properties is provided in the exemplification section and in FIGS. 7A through 7J.

In an embodiment, the magnet of the present invention can obtain a percent recovery of at least about 10% (e.g., 10%, 15%, 20%, 25%, 30%, 35%, 40%, 45%, 50%, 55%, 60%, 65%, 70%, 75%, 80%, 85%, 90%, 95%, 100%, 120%, 150%, or 200%) increase over the amount recovered using a standard ring magnet. Percent recovery can be measured at various time points between about 30 seconds to about 25 minutes (e.g., about 0.5, 1, 1.5, 2, 2.5, 3, 3.5, 4, 4.5, 5, 5.5, 6, 6.5, 7, 7.5, 8, 8.5, 9, 9.5, 10, 12.5, 15, 17.5, 20, 22.5, 25 minutes) and at various volumes ranging between about 50 and about 2000 μL (e.g., 50, 100, 150, 200, 250, 300, 500, 750, 1000, 2000 μL).

In one embodiment when comparing the discontinuous cavity wall solid core magnet with the continuous cavity wall solid core magnet, when using manual pipetting along the side of the cavity wall (e.g., at a gap in the cavity wall), the discontinuous cavity wall magnet of the present invention can obtain a percent recovery of at least about 1 to about 15% (e.g., 1, 2, 3, 4, 5, 6, 7, 8, 9, 10, 11, 12, 13, 14, or 15%) increase over the amount recovered using a continuous cavity wall solid core magnet.

Standard conditions for forming the macromolecule-bead complex are known in the art and can be found, for example, in Rohland, et al., Cost-Effective High-Throughput DNA Sequencing Libraries For Multiplexed Target Capture, *Genome Research* 22:939-946 and Supplemental Notes (the entire teachings of which are incorporated herein by reference). For example, reagent kits that can be used to form the macromolecule-bead complex are commercially available, such as the AMPURE composition from Beckman Coulter, or such reagents can be made. One example of a solid phase reversible immobilization reagent that can be made and used with the present invention is a MagNA composition, which is made from:

Sera-Mag SpeedBead Carboxylate-Modified Magnetic Particles (Hydrophylic),
100 mL (GE Healthcare Product No. 45152105050350; previously known as 0.1% carboxyl-modified Sera-Mag Magnetic Speed-beads (FisherSci, cat. #: 09-981-123)
18% PEG-8000 (w/v) (e.g. Sigma Aldrich, cat. #: 89510)
1M NaCl
10 mM Tris-HCl, ph 8.0
1 mM EDTA, pH 8.0
Optional: 0.05% Tween 20

To form the macromolecule-bead complex, in one embodiment, 0.5×-3× MagNA in an amount ranging from 10 microliters to 400 microliters can be added to the mixture.

Exemplification

Introduction:

Magnetic-bead-based nucleic acid purification is a standard technique in high-throughput sequencing. Purification steps occur at various points in the sample preparation workflow, from the original extraction of DNA out of a biological sample, to enzymatic conditioning steps, PCR cleanup, and size selection. To enable automated processing, the samples are usually transferred from a primary container, like a collection tube, Eppendorf vial or the like, to a microplate. Microplates exist in many different specialized formats from 6 wells (2×3) to several thousand wells. The most common format is the 96-well plate, wherein the wells, i.e. the individual cavities holding the samples, are arranged in an 8×12 array. Aside from the number of wells, microplates can vary greatly with regard to the volume per well, the shape of the wells, the materials used, and other parameters depending on the intended application. Despite all their differences, industry groups have agreed to a set of parameters defining certain dimensions of microplates with the goal of maintaining their suitability for automated processing in standard robotic lab instruments. These standards are maintained by the Society for Lab Automation and Screening (SLAS) and can be downloaded from their website at www.slas.org/resources/information/industry-standards.

The basic principle of magnetic bead separations includes the sequestration of magnetic beads from the reaction matrix by exposing them to a magnetic field. The magnetic force then immobilizes the beads, allowing supernatant to be removed while the beads, with their attached payload, are retained.

The most common way of applying a magnetic field is achieved by placing the microplate on top of a magnet plate that complements the microplate. Magnet plates are arrangements of permanent magnets in an array similar to the array of wells of the microplate types for which they are made. Just like there are various microplate types—with 24 wells, 96, 384 and so on, there are different magnet plates as well. Some magnet plates use post magnets, where one post magnet is located in the center of 4 wells; also available are plates with bar magnets, where each bar magnet serves an entire row or column of wells of a microplate. A type of magnet plate is a ring magnet plate with 96 ring-shaped permanent magnets. The ring shape cavity is particularly useful because it produces a ring-shaped magnetic field, causing the magnetic beads to aggregate in the same ring pattern in the microplate well. In this process, an area in the center of the ring remains bead-free, allowing a pipet tip to reach the well bottom and aspirate all liquid without disturbing the magnetic beads.

With the microplate still on the magnet, the beads are allowed to dry before elution buffer is added to release the DNA from the beads. It is important to note that the volume of elution buffer necessary to achieve complete elution must be sufficient to cover the beads entirely; if a bead does not come into contact with elution buffer, the DNA will stay on the bead. At the same time, it is desirable to keep the elution volume as low as possible so as not to unnecessarily dilute the product (e.g. the purified, eluted DNA).

The minimum elution volume is a function of the location of the bead ring inside the well. Lower bead rings allow for smaller elution volumes. FIGS. 4A and 4B show how the position of the bead ring depends on the geometry of the well and the magnet. The PCR well in FIG. 4B enters the ring magnet significantly lower than the PCR well in FIG. 4A. In an embodiment as shown in FIG. 4B, the elution volume to cover the beads is about 35 µl. This is especially problematic because PCR plates, which have a well volume of only about 150-200 µl, are sometimes used for low volume reactions with low amounts of DNA. Eluting small amounts of DNA in larger volumes of elution buffer may lead to unacceptably low DNA concentrations.

Other possible approaches use adapters between the magnet plate (with ring magnets sized for round bottom wells as in 4D) to support a PCR plate. While viable in individual cases; the significant disadvantage is that the adapter relies on specific PCR plate geometries; in other words, it is not a universal solution but only works with certain PCR plate types.

On the contrary, the solid core ring magnet is universal and achieves low elution volumes. The solid core ring magnet of the present invention also separates the macromolecule/magnet beads faster and with more recovery, as compared to standard ring magnets. The following experiments were designed to demonstrate the application of the solid core ring magnet.

To verify the expected gain in performance, two experiments were conducted.

Experiment 1: Comparison of the Pull Force Between a Solid Core Ring Magnet and a Standard Ring Magnet A solid-core ring magnet and a standard ring-magnet were manufactured with the properties shown in Table 1.

TABLE 1

Magnet Properties

|  | Solid Core Ring Magnet | Standard Ring Magnet |
|---|---|---|
| Outer Diameter | 8.6 mm | 8.6 mm |
| Inner Diameter | 4.3 mm to a depth of 2.5 mm, on both sides | 4.3 mm through |
| Thickness (Height) | 11.5 mm | 11.5 mm |
| Magnetic Grade | N50, NdFeB | N50, NdFeB |
| Magnetization | Through the Thickness | Through the Thickness |
| Volume of Magnetic Material | 613.2855 mm$^3$ | 500.8373 mm$^3$ |

The Solid Core Ring Magnet contains about 22.45% more magnetic material than the regular ring magnet with the same outer dimensions. In an embodiment, the solid core ring magnet of the present invention has between about 10% to about 30% more magnetic material, as compared to a standard ring magnet.

After this, an experiment was performed to determine the differences in pull forces between the two magnets across different distances. The data was generated using a model ES30 test stand equipped with a force gauge Model M5-20 and a Mitutoyo travel gauge, model ESM001 (all Mark-10 Corporation, 11 Dixon Avenue, Copiague, NY 11726, US).

Figure 6:
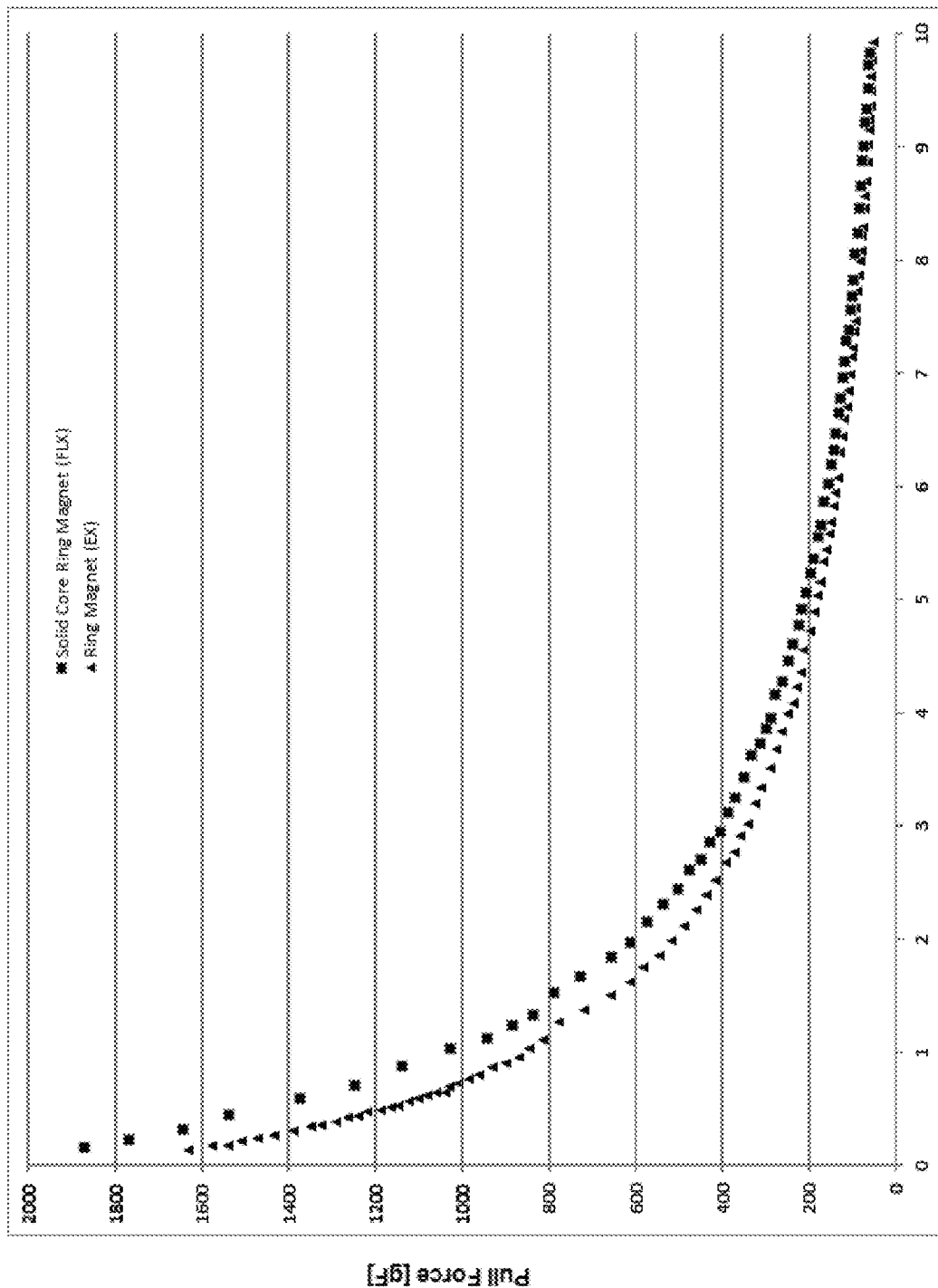
FIG. 6 is a line plot chart of differences in pull forces measured between a magnetic fixture and the solid core ring magnet (squares) or ring magnet (triangles). The measurement was done using a digital force gauge.

FIG. 6 shows the results for comparing pull forces between a magnetic fixture on one side and a solid core ring magnet or a standard ring magnet on the other side. Both of the magnets used were grade N50, NdFeB, 8.6 mm diameter, and 11.5 mm thick. The ring magnet had an inner diameter of 4.3 mm. The solid core ring magnet had two cavities, one on each side, with a diameter of 4.3 mm and a depth of 2.5 mm. Both magnets were magnetized through the thickness (i.e., along the center axis). As seen, for a certain distance value, especially for lower values of distances, the solid core ring magnet has a stronger pull force. Because both magnets are equivalent (same outer dimensions and magnetic grade) except that the standard magnet is drilled through all the way, the stronger pull forces in the solid core magnet result from the shape of the magnet, specifically the additional magnetic material present in the core of the solid core ring magnet.

FIG. 6 shows the pull force between the test magnet and the magnetic fixture. The magnetic fixture was the same in both tests.

Results:

Table 2 shows selected data points with the difference in pull force as % change.

TABLE 2

Pull Force Comparison; Selected Data Points

| Standard Ring Magnet | | Solid Core Ring Magnet | | |
|---|---|---|---|---|
| Travel [mm] | Load [gF] | Travel [mm] | Load [gF] | % Difference |
| 35 | 2 | 35.05 | 2 | 0.0% |
| 33.5 | 2 | 33.5 | 2 | 0.0% |
| 32.08 | 2 | 32.08 | 2 | 0.0% |
| 28.46 | 2 | 28.44 | 2 | 0.0% |
| 22.18 | 6 | 22.19 | 6 | 0.0% |
| 22 | 6 | 21.97 | 6 | 0.0% |
| 21.52 | 6 | 21.56 | 8 | 33.3% |
| 21.34 | 8 | 21.38 | 8 | 0.0% |
| 15.04 | 20 | 15.06 | 22 | 10.0% |
| 13.52 | 26 | 13.52 | 30 | 15.4% |
| 12.71 | 30 | 12.71 | 34 | 13.3% |
| 11.5 | 38 | 11.53 | 42 | 10.5% |
| 10.57 | 46 | 10.54 | 52 | 13.0% |
| 9.49 | 60 | 9.52 | 66 | 10.0% |
| 8.08 | 80 | 8.05 | 94 | 17.5% |
| 6.99 | 108 | 6.96 | 124 | 14.8% |
| 5.58 | 154 | 5.55 | 180 | 16.9% |
| 5.33 | 168 | 5.36 | 190 | 13.1% |
| 5.03 | 182 | 5.06 | 206 | 13.2% |

TABLE 2-continued

Pull Force Comparison; Selected Data Points

| Standard Ring Magnet | | Solid Core Ring Magnet | | |
|---|---|---|---|---|
| Travel [mm] | Load [gF] | Travel [mm] | Load [gF] | % Difference |
| 3.84 | 264 | 3.86 | 300 | 13.6% |
| 3.2 | 326 | 3.24 | 370 | 13.5% |
| 1.99 | 520 | 1.97 | 614 | 18.1% |
| 1.85 | 548 | 1.84 | 656 | 19.7% |
| 1.51 | 660 | 1.52 | 788 | 19.4% |
| 1.11 | 814 | 1.12 | 944 | 16.0% |
| 1.03 | 846 | 1.03 | 1028 | 21.5% |
| 0.86 | 930 | 0.87 | 1138 | 22.4% |
| 0.59 | 1102 | 0.58 | 1376 | 24.9% |
| 0.43 | 1240 | 0.44 | 1536 | 23.9% |
| 0.3 | 1390 | 0.31 | 1642 | 18.1% |
| 0.21 | 1510 | 0.22 | 1768 | 17.1% |
| 0.14 | 1634 | 0.15 | 1870 | 14.4% |

Result:

A comparison of the pull force generated between a regular ring magnet D=8.6 mm, d=4.3 mm, and H=11.5 mm, and a solid core ring magnet of equivalent dimensions and grade shows significant differences in the range from 0 to about 15 mm of distance. The greatest difference was measured at 0.58 mm distance with 24.9%. (A difference reading of 33% shown near the top of the table, at about 21.5 mm of distance, is considered noise. The signal, i.e. the pull force measured, is low at this point, and the reading is surrounded on both sides by values of 0%.)

Experiment 2: Bead Separation Time Comparison

Additional experiments were performed to investigate the bead separation times for the different magnets.

As described herein, the detection method by which the present invention was compared to current plate based magnetic separation devices by spectrophotometry. In standard high-throughput NGS DNA sequencing workflows, each enzymatic process step is followed by a cleanup step where the DNA is selectively bound to iron cored beads through the addition of 0.1% carboxyl-modified Sera-Mag Speed-beads, 20% polyethylene glycol (PEG), and 2.5 M NaCl buffer in a mix ratio of 1.8× beads and buffer to 1× sample. The mixture is placed in a magnetic field, which pulls the beads and bound DNA to the sides of the well so that the reagents, washes and/or unwanted fragments can be removed as a supernatant. The percent of bound material captured and the time it takes for this capture to occur is of paramount importance for maintaining quality and throughput levels. Here we attempt to quantify this recovery metric without the need to test the efficiency of the capture chemistry. This was accomplished by simulating a given reaction volume at a set end point, by replacing enzymatic components with water while keeping the total reaction volume at 1.8× bead/PEG/NaCl mix: 1× sample. We do not expect that beads bound with DNA will move significantly different through the PEG/NaCl matrix than those unbound to DNA.

A Detailed Procedure for Bead Detection:

A large quantity of 1.8×0.1% carboxyl-modified Sera-Mag Speed-beads (Thermo-Fisher Scientific, Pittsburg PA, USA, Cat number 09-981-123), 20% polyethylene glycol (PEG) (Sigma-Aldrich, St. Louis MO, USA, Cat number 89510-250G-F), 2.5 M NaCl (Sigma-Aldrich, St. Louis MO, USA, Cat number S6546-1L), 0.05% Tween-20 (Sigma-Aldrich, St. Louis MO, USA, Cat number P9416-50ML) and 1× water were premixed and set aside. A predetermined amount of bead/water mix was arrayed in groups of three per time point to either an Eppendorf twin.tec semi-skirted PCR plate (Eppendorf AG, Hamburg, Germany, Cat number 951020362) or a RK Riplate deep-well plate (BioExpress, Kaysville UT, USA, Cat number 850356). Reaction volumes between 50-300 ul utilized the Eppendorf twin.tec plate and 500-2000 ul utilized the RK Riplate. Samples were arrayed in columns so that three samples were used for every end-point and all samples had a zero time point used as a control. End-points for 50-100 ul trials were 30 seconds-3 mins sampled in 30 second intervals, for 150-200 ul trials 30 seconds-5 min in 30 second intervals, for 200-750 ul trials 1 min-5 min in 30 second intervals, and for 1000-2000 ul trials 2.5-25 mins in 2.5 min intervals. Samples were arrayed using a 20-200 ul LTS multichannel pipette (Rainin Instruments LLC, Oakland CA, USA, cat number L12-20XLS) or a 1000 ul single channel pipette (Gilson Inc., Middleton WI, USA, cat number P1000). After arraying, the samples were left on the bench for exactly 5 minutes to simulate DNA binding time. The 96-well plate was then placed on the magnetic separator plate and a timer was started. At the set end-point all liquid was removed from the end point wells using a multichannel pipette with a smooth constant pipetting motion so as to cause as little disturbance to the formed bead ring as possible. Liquid was completely transferred to the corresponding wells of a second 96 well plate. All remaining time points of the same volume were processed in a similar manner. Transferred samples were then mixed 10× with a multichannel pipette to make sure any beads that may have settled had been completely resuspended. 50 ul, taken from the middle of transferred sample, was then aliquoted to the corresponding well of a 96 well flat bottomed plate (Thermo-Fisher Scientific, Pittsburgh PA, USA, Cat number 12-565-501) for analysis.

Detection and Analysis Methods:

Samples and blanks were analyzed for absorbance based on published specifications using a Tecan Infinite 200 Pro Multiplate reader with i-control microplate reader analysis software (Tecan Group, Ltd, Mannedorf, Switzerland) measuring absorbance at 560 nm. Samples were shaken in orbital mode at 3.5 amplitude for 3 seconds and then read at 25 flashes per well. All plates were read in duplicate and the resulting absorbance was averaged. Absorbance data was further analyzed using IMP 11.2 software (SAS, Cary NC, USA) for consistency between data points. Absorbance readings obtained for the blank wells were averaged together and used as a normalization control for all wells containing sample. Total percent of beads captured was calculated as a reverse function of the normalized absorbance of beads remaining in solution divided by the total absorbance of beads present in the control, or zero, time point. Results were then plotted in Excel (Microsoft Corp, Redmond WA, USA) against the results of similar volume points obtained using other magnetic separation devices.

TABLE 3

| 50 ul | Time | Std. Ring Mag. | Solid Core Ring Mag. | % diff | 100 | Time | Std. Ring Mag. | Solid Core Ring Mag. | % diff |
|---|---|---|---|---|---|---|---|---|---|
| | 30 | 80.07667297 | 94.69176 | 15.43% | | 30 | 37.23995636 | 70.81196 | 47.41% |
| | 1 | 95.43984145 | 98.15866 | 2.77% | | 1 | 74.19305795 | 94.99906 | 21.90% |

TABLE 3-continued

| | | | | | | | | |
|---|---|---|---|---|---|---|---|---|
| | 1.5 | 95.93133422 | 98.35559 | 2.46% | 1.5 | 92.06909531 | 98.67371 | 6.69% |
| | 2 | 98.13500867 | 98.81871 | 0.69% | 2 | 96.47286979 | 99.03945 | 2.59% |
| | 2.5 | 98.34947811 | 99.6389 | 1.29% | 2.5 | 97.81330423 | 98.88796 | 1.09% |
| | 3 | 98.28871191 | 99.40518 | 1.12% | 3 | 98.69262933 | 99.60428 | 0.92% |

| 150 | Time | Std. Ring Mag. | Solid Core Ring Mag. | % diff | 200 | Time | Std. Ring Mag. | Solid Core Ring Mag. | % diff |
|---|---|---|---|---|---|---|---|---|---|
| | 30 | 26.07026337 | 50.14476 | 48.01% | | 30 | 19.39311039 | 40.41279 | 52.01% |
| | 1 | 58.09414013 | 87.10766 | 33.31% | | 1 | 40.63989389 | 79.76918 | 49.05% |
| | 1.5 | 74.4081237 | 96.27048 | 22.71% | | 1.5 | 51.16319869 | 93.50042 | 45.28% |
| | 2 | 91.05810939 | 98.5482 | 7.60% | | 2 | 71.00878141 | 96.39816 | 26.34% |
| | 2.5 | 94.28230152 | 99.46902 | 5.21% | | 2.5 | 82.93686286 | 97.83296 | 15.23% |
| | 3 | 94.93285923 | 99.67461 | 4.76% | | 3 | 89.07426608 | 98.66614 | 9.72% |
| | 3.5 | 97.76385719 | 99.67894 | 1.92% | | 3.5 | 92.52722613 | 98.97777 | 6.52% |
| | 4 | 96.78087165 | 99.58156 | 2.81% | | 4 | 94.01421458 | 99.10329 | 5.14% |
| | 5 | 98.59671404 | 99.77849 | 1.18% | | 5 | 92.9525902 | 99.53503 | 6.61% |

| 250 | Time | Std. Ring Mag. | Solid Core Ring Mag. | % diff | 300 | Time | Std. Ring Mag. | Solid Core Ring Mag. | % diff |
|---|---|---|---|---|---|---|---|---|---|
| | 30 | 40.27648591 | 69.44254 | 42.00% | | 30 | 31.69413085 | 65.15978 | 51.36% |
| | 1 | 59.90045115 | 89.61199 | 33.16% | | 1 | 48.70156597 | 84.5415 | 42.39% |
| | 1.5 | 68.49710442 | 95.17374 | 28.03% | | 1.5 | 57.02298399 | 93.05292 | 38.72% |
| | 2 | 80.3501216 | 96.40295 | 16.65% | | 2 | 66.49896343 | 95.38798 | 30.29% |
| | 2.5 | 87.17382752 | 98.30087 | 11.32% | | 2.5 | 76.29664731 | 97.13225 | 21.45% |
| | 3 | 90.64823436 | 98.90033 | 8.34% | | 3 | 82.53413641 | 97.63 | 15.46% |
| | 3.5 | 92.45692777 | 99.30069 | 6.89% | | 3.5 | 85.17211198 | 98.85488 | 13.84% |
| | 4 | 95.00196603 | 99.65343 | 4.67% | | 4 | 89.16481993 | 99.01394 | 9.95% |
| | 5 | 95.23430771 | 99.67508 | 4.46% | | 5 | 92.34254341 | 99.29203 | 7.00% |

| 500 | Time | Std. Ring Mag. | Solid Core Ring Mag. | % diff | 750 | Time | Std. Ring Mag. | Solid Core Ring Mag. | % diff |
|---|---|---|---|---|---|---|---|---|---|
| | 30 | 34.52842754 | 78.66054 | 56.10% | | 30 | 26.77121484 | 48.41286 | 44.70% |
| | 1 | 55.21212412 | 91.83777 | 39.88% | | 1 | 41.5258199 | 81.40246 | 48.99% |
| | 1.5 | 68.91535241 | 94.73334 | 27.25% | | 1.5 | 52.50342389 | 90.49603 | 41.98% |
| | 2 | 78.2893862 | 96.90827 | 19.21% | | 2 | 60.71564171 | 91.49368 | 33.64% |
| | 2.5 | 85.40605401 | 97.99248 | 12.84% | | 2.5 | 67.3773034 | 93.25959 | 27.75% |
| | 3 | 87.73410062 | 98.62873 | 11.05% | | 3 | 72.559085 | 95.53839 | 24.05% |
| | 3.5 | 90.52157227 | 98.6125 | 8.20% | | 3.5 | 77.22843141 | 97.18311 | 20.53% |
| | 4 | 92.32393149 | 98.51512 | 6.28% | | 4 | 84.04470492 | 94.31459 | 10.89% |
| | 5 | 93.04399126 | 99.04207 | 6.06% | | 5 | 85.71453813 | 97.83018 | 12.38% |

| 1000 | Time | Std. Ring Mag. | Solid Core Ring Mag. | % diff | 2000 | Time | Std. Ring Mag. | Solid Core Ring Mag. | % diff |
|---|---|---|---|---|---|---|---|---|---|
| | 2.5 | 47.65286868 | 86.54932 | 44.94% | | 2.5 | 34.71005201 | 63.42803 | 45.28% |
| | 5 | 83.80165204 | 97.45749 | 14.01% | | 5 | 59.59467814 | 86.48007 | 31.09% |
| | 7.5 | 91.55886375 | 98.35018 | 6.91% | | 7.5 | 77.52805007 | 93.11305 | 16.74% |
| | 10 | 92.38052749 | 98.53521 | 6.25% | | 10 | 79.11083052 | 94.19294 | 16.01% |
| | 12.5 | 95.53023817 | 98.59689 | 3.11% | | 12.5 | 83.89522614 | 95.7143 | 12.35% |
| | 15 | 96.76273362 | 98.42809 | 1.69% | | 15 | 87.78547741 | 94.21133 | 6.82% |
| | 17.5 | 97.02336867 | 98.00825 | 1.00% | | 17.5 | 89.66750789 | 96.04108 | 6.64% |
| | 20 | 97.28400404 | 99.08057 | 1.81% | | 20 | 87.96574837 | 97.4867 | 9.77% |
| | 22.5 | 96.58603189 | 99.85315 | 3.27% | | 22.5 | 90.59770681 | 96.22719 | 5.85% |
| | 25 | 97.83177987 | 99.65838 | 1.83% | | 25 | 91.97137297 | 98.01907 | 6.17% |

Figure 7A:
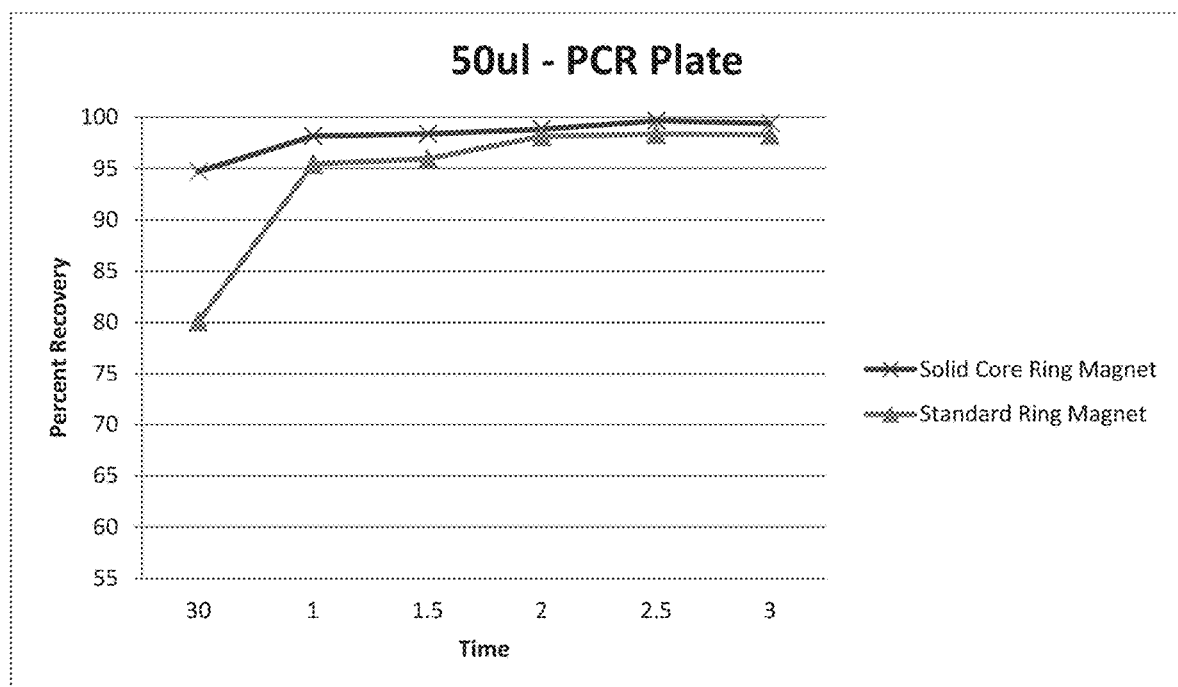
FIG. 7A is a line plot chart of the percent bead recovery over (30 seconds, 1, 1.5, 2, 2.5, 3 minutes) time from 50 microliters of solution in a PCR plate, showing the difference between a standard ring magnet (triangles) and a solid-core ring-magnet ("X") both having the same outer dimensions and magnetic grade.
Figure 7B:
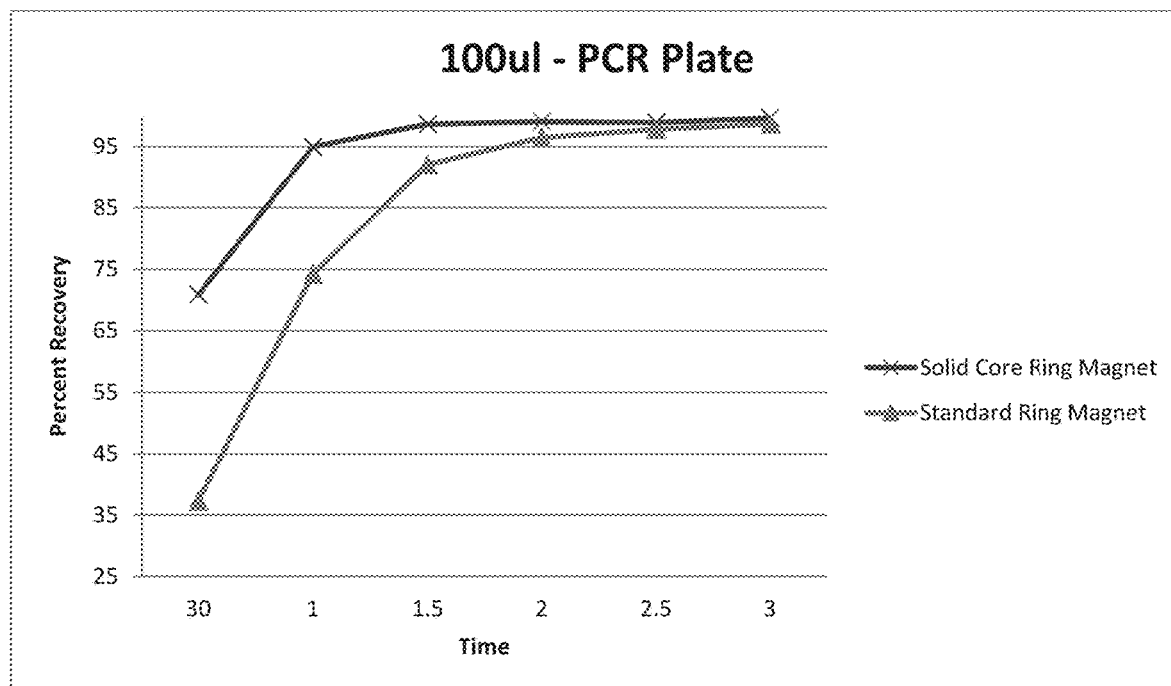
FIG. 7B is a line plot chart of the percent bead recovery over time (30 seconds, 1, 1.5, 2, 2.5, 3 minutes) from 100 microliters of solution in a PCR plate, showing the difference between a standard ring magnet (triangles) and a solid-core ring-magnet ("X") both having the same outer dimensions and magnetic grade.
Figure 7C:
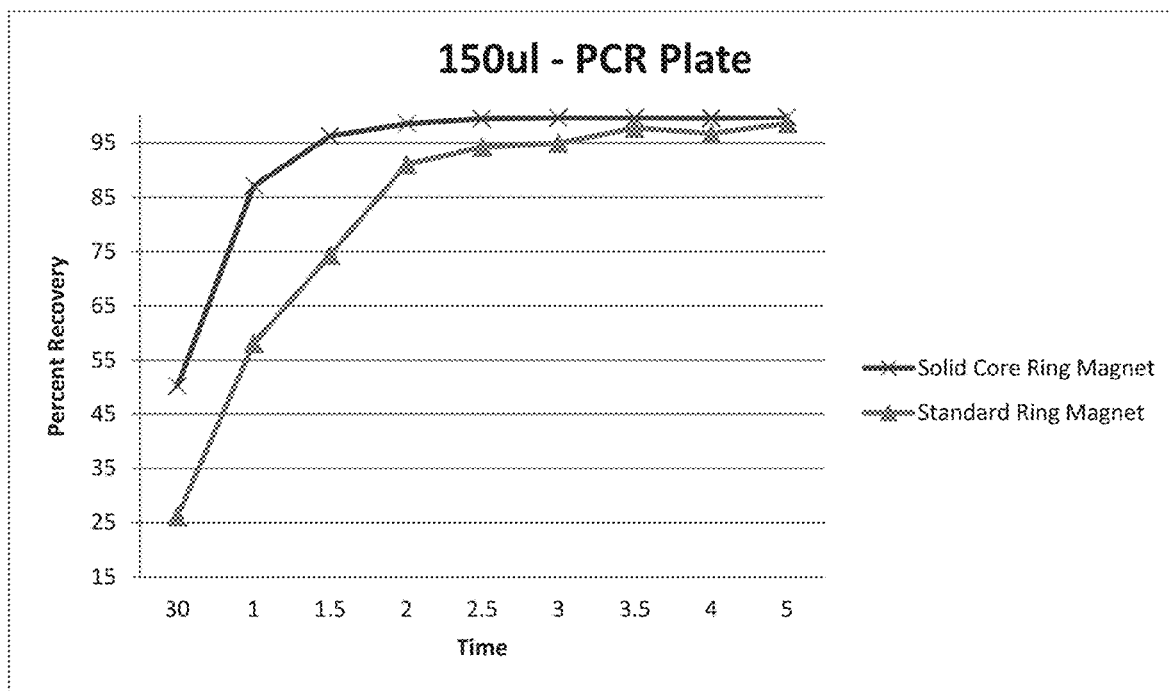
FIG. 7C is a line plot chart of the percent bead recovery over time (30 seconds, 1, 1.5, 2, 2.5, 3, 3.5, 4 and 5 minutes) from 150 microliters of solution in a PCR plate, showing the difference between a standard ring magnet (triangles) and a solid-core ring-magnet ("X") both having the same outer dimensions and magnetic grade.
Figure 7D:
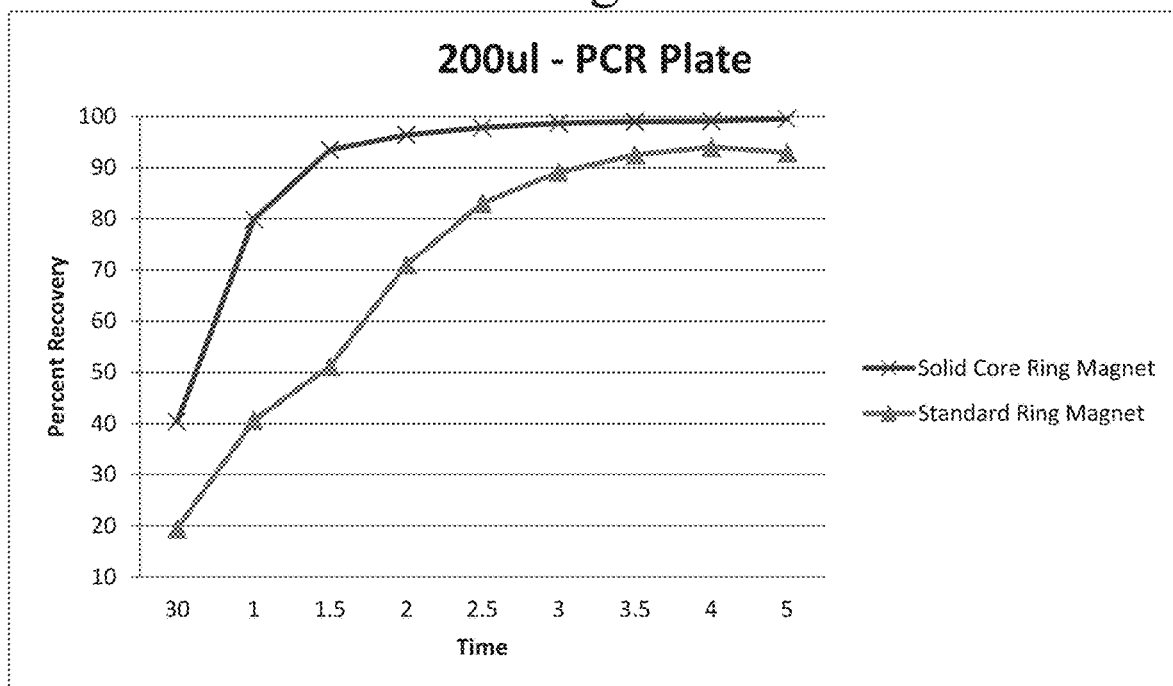
FIG. 7D is a line plot chart of the percent bead recovery over time (30 seconds, 1, 1.5, 2, 2.5, 3, 3.5, 4 and 5 minutes) from 200 microliters of solution in a PCR plate, showing the difference between a standard ring magnet (triangles) and a solid-core ring-magnet ("X") both having the same outer dimensions and magnetic grade.
Figure 7E:
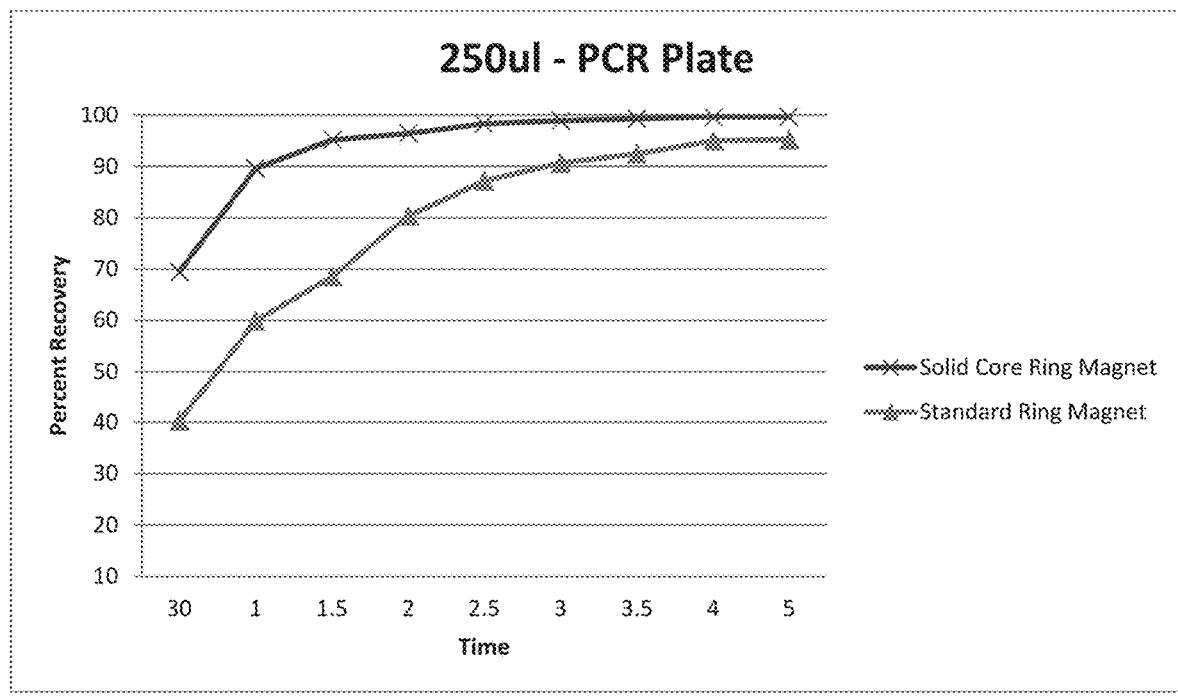
FIG. 7E is a line plot chart of the percent bead recovery over time (30 seconds, 1, 1.5, 2, 2.5, 3, 3.5, 4 and 5 minutes) from 250 microliters of solution in a PCR plate, showing the difference between a standard ring magnet (triangles) and a solid-core ring-magnet ("X") both having the same outer dimensions and magnetic grade.
Figure 7F:
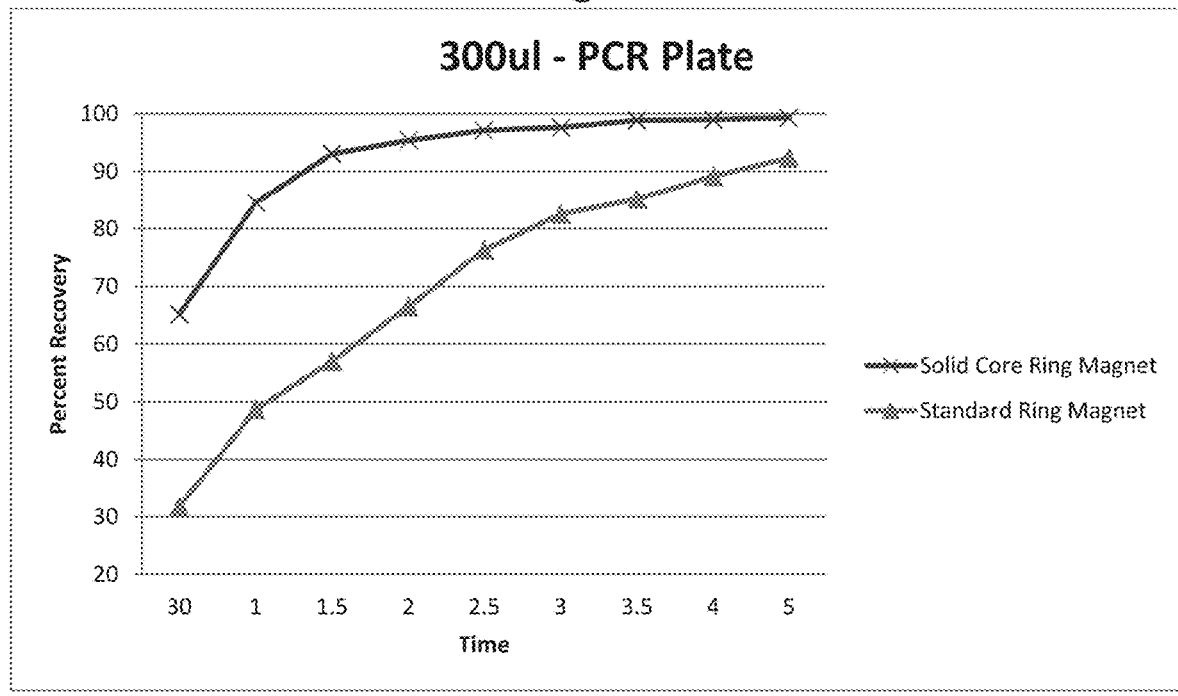
FIG. 7F is a line plot chart of the percent bead recovery over time (30 seconds, 1, 1.5, 2, 2.5, 3, 3.5, 4 and 5 minutes) from 300 microliters of solution in a PCR plate, showing the difference between a standard ring magnet (triangles) and a solid-core ring-magnet ("X") both having the same outer dimensions and magnetic grade.
Figure 7G:
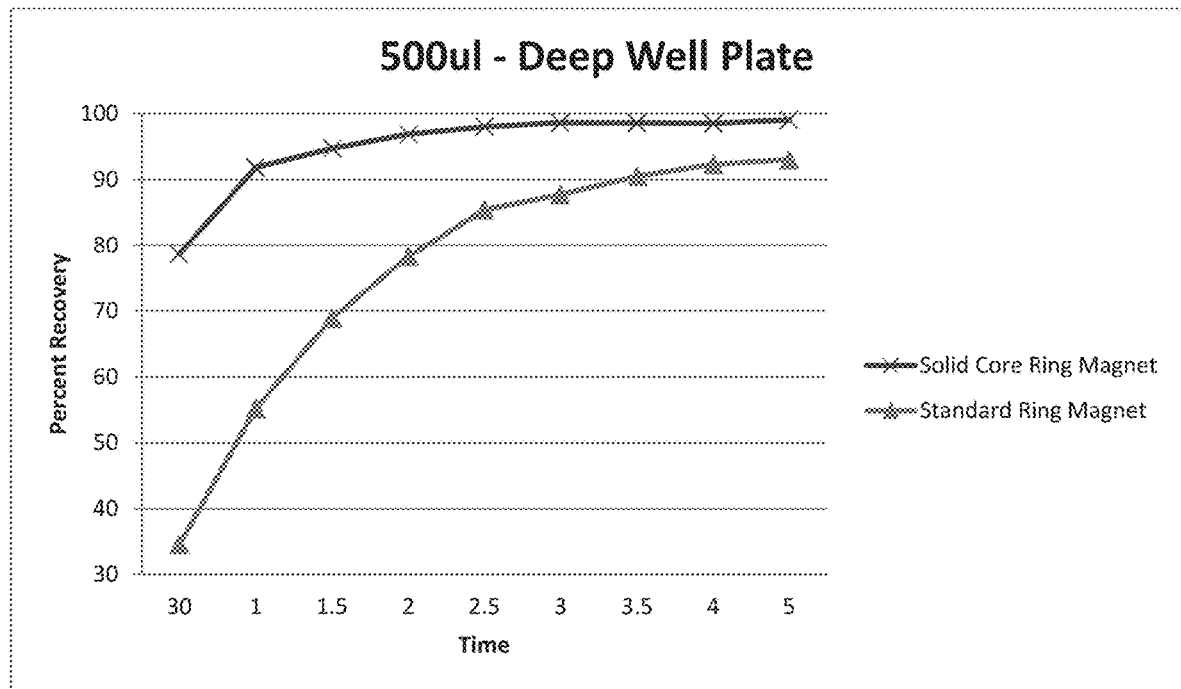
FIG. 7G is a line plot chart of the percent bead recovery over time (30 seconds, 1, 1.5, 2, 2.5, 3, 3.5, 4 and 5 minutes) from 500 microliters of solution in a deep well plate, showing the difference between a standard ring magnet (triangles) and a solid-core ring-magnet ("X") both having the same outer dimensions and magnetic grade.
Figure 7H:
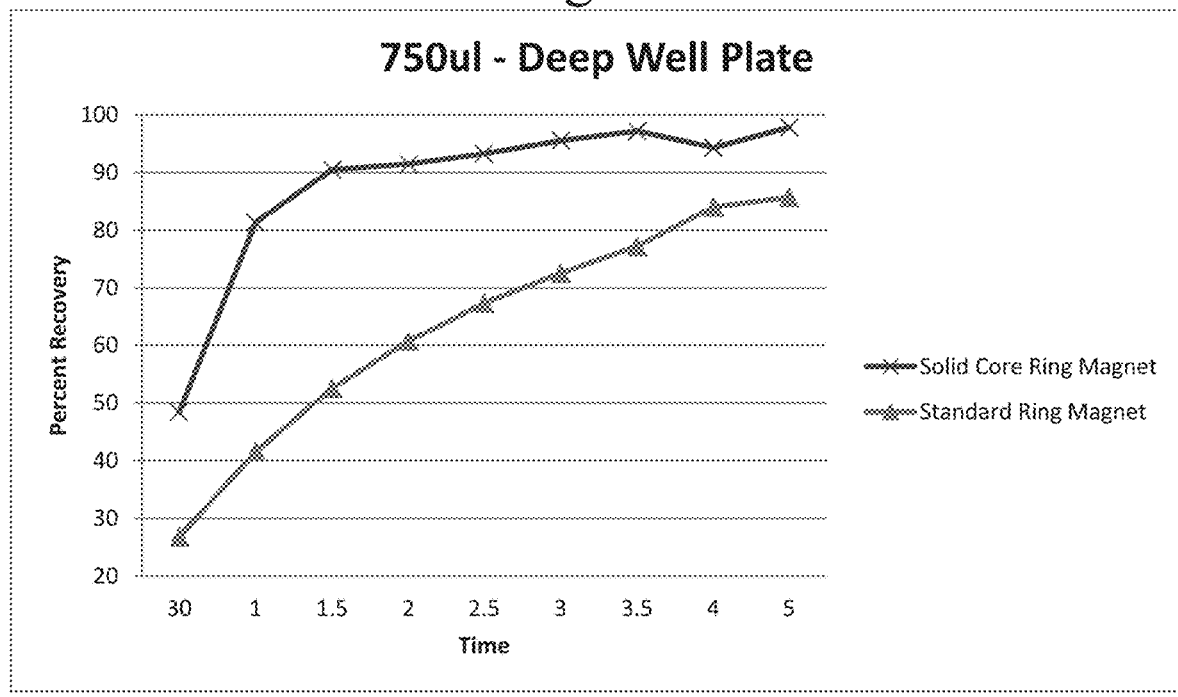
FIG. 7H is a line plot chart of the percent bead recovery over time (30 seconds, 1, 1.5, 2, 2.5, 3, 3.5, 4 and 5 minutes) from 750 microliters of solution in a deep well plate, showing the difference between a standard ring magnet (triangles) and a solid-core ring-magnet ("X") both having the same outer dimensions and magnetic grade.
Figure 7I:
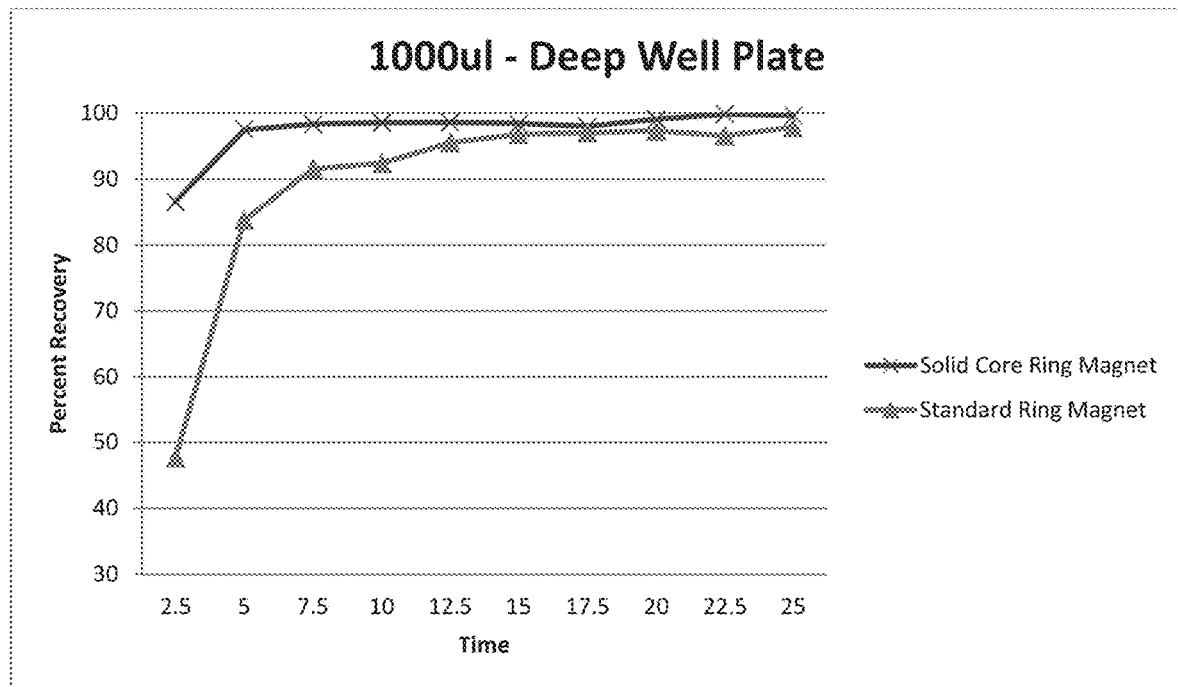
FIG. 7I is a line plot chart of the percent bead recovery over time (2.5, 5, 7.5, 10, 12.5, 15, 17.5, 20, 22.5, 25 minutes) from 1000 microliters of solution in a deep well plate, showing the difference between a standard ring magnet (triangles) and a solid-core ring-magnet ("X") both having the same outer dimensions and magnetic grade.
Figure 7J:
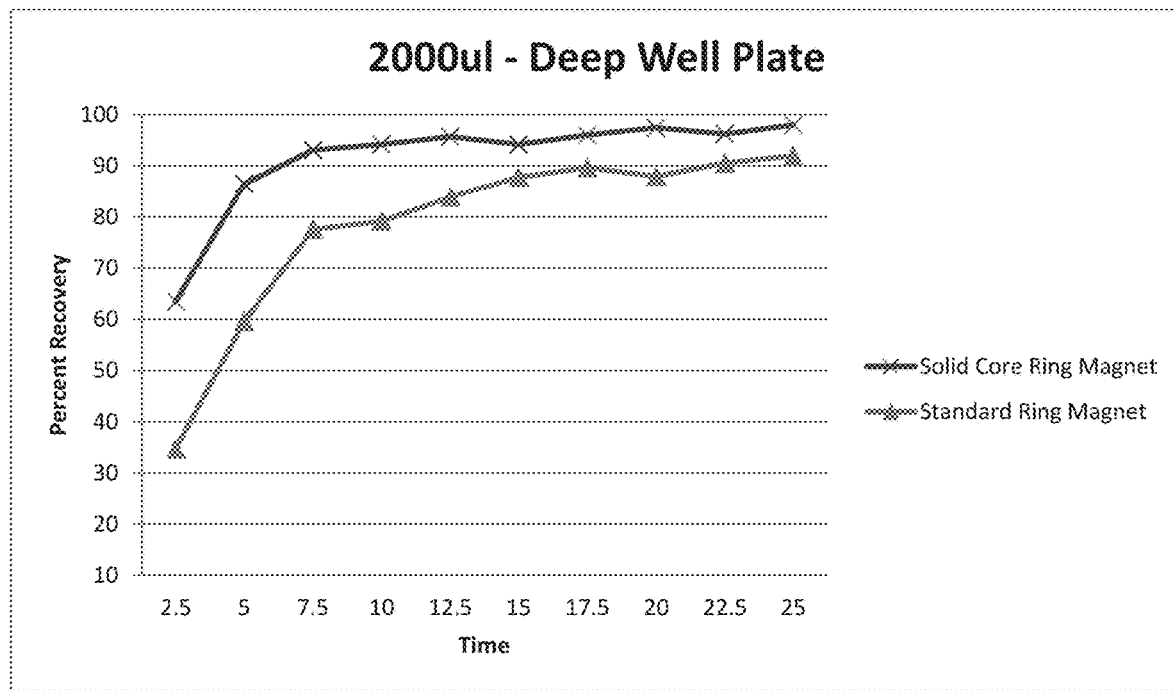
FIG. 7J is a line plot chart of the percent bead recovery over time (2.5, 5, 7.5, 10, 12.5, 15, 17.5, 20, 22.5, 25 minutes) from 2000 microliters of solution in a deep well plate, showing the difference between a standard ring magnet (triangles) and a solid-core ring-magnet ("X") both having the same outer dimensions and magnetic grade.

FIG. 7A shows the results for a 50 μL PCR plate, FIG. 7B for a 100 μL PCR plate, FIG. 7C for a 150 μL PCR plate, FIG. 7D for a 200 μL PCR plate, FIG. 7E for a 250 μL PCR plate, FIG. 7F for a 300 μL PCR plate, FIG. 7G for a 500 μL deep-well plate, FIG. 7H for a 750 μL deep-well plate, FIG. 7I for a 1000 μL deep-well plate, and FIG. 7J for a 2000 μL deep-well plate. In each of these results, especially for shorter attempted recovery times, it is clear that the percentage yield of the recovered beads is higher for a solid-core ring-magnet as compared to an equivalent ring-magnet. Similarly, when comparing similar amounts of recovery, it is clear that the solid-core ring-magnet allows recovery of a similar percentage within a shorter period of time.

Experiment 3 A High Efficiency 96 Well Magnetic Particle Separation Device Designed for Use with Manual Pipettors The isolation or purification of macromolecules (e.g., DNA, RNA, and proteins) is routinely required prior to their use in a multitude of applications. The use of magnetic particles coated with a variety of functional groups is widely used for these applications. Although initially most commonly used in high throughput workflows in conjunction with liquid handling robotics, magnetic particles are increasingly used in low to moderate throughput workflows due to their ease of use, efficiency, and low cost. In a typical low to moderate throughput workflow users accomplish liquid transfer steps using multi or single channel manual pipettors in conjunction with a 96 well magnetic particle separator. Efficient separation and recovery of the paramagnetic particles complexed to the desired macromolecule is dependent on a number of factors; viscosity and volume of the liquids being used, the type and design of the vessel or labware being employed, and importantly the design of the magnetic particle separator. For manual users the magnetic plate must employ powerful magnets and collect the magnetic particles in a fashion that minimizes any inadvertent bead loss due to variations of individual pipetting techniques.

To this end a novel highly powerful magnetic particle separator, a gapped or slotted solid-core ring magnet ("SS-CRM"), was designed and tested. The SSCRM had two segments and two gaps similar to that shown in FIGS. 9A, 11A, 12A, and 13. These magnets collect and concentrate the magnetic particles into opposing regions near the bottom of the labware wells, as shown in FIG. 10B. This gapped/slotted design allows manual users greater flexibility in their approach to removing supernatants with a higher degree of confidence that magnetic particles will not be inadvertently aspirated during any sample processing steps.

The data using a discontinuous cavity wall solid core magnet demonstrates the advantage of its design when using paramagnetic particles complexed to lambda DNA and extracted by using manual pipettors and a commonly used magnetic particle purification chemistry.

B. Methods and Materials

1) Assembly of the gapped or slotted solid-core ring magnet ("SSCRM")

A solid cylindrical magnet was inserted into a hollow ring magnet having two segments and two gaps, as shown in FIG. 11A.

2) Assembly of magnetic particle purification chemistry (MPPC).

50 mLs of a solution containing the following components was assembled:

10 gms of 20% PEG-8000 (w/v), Sigma, cat. #: 89510
20 mL of 5M NaCl, Sigma, cat. #: S7653
500 uL of 100× Tris-EDTA Buffer Solution, Sigma T9285-100
Add Sigma Nuclease Free Water PN:W4502, to a final volume of 50 mL.
Mix all components until solution is clear.
Add 1.2 mLs of Sera-Mag Magnetic Carboxylate Modified Particles.
Mix solution again until magnetic particles are evenly dispersed.

3) Recovery Testing in Eppendorf PCR plates, (Eppendorf Cat. #: 0030 133.390)

(a) A master mixture of 56 uL of lambda DNA (New England BioLabs, PN: N3011S) at 500 ng/uL, 28 uL Bovine Serum Albumin (BSA Solution, Ambion, PN: AM2616) at 50 mg/mL, 1.4 mLs of 1× Tris-EDTA diluted in nuclease free water (100× Tris-EDTA Buffer Solution (Sigma T9285-100—diluted in Sigma Nuclease Free Water PN:W4502, and 2.5 mLs of MPPC (see section 2 above) was assembled and gently mixed. The mixture was allowed to incubate for 5 minutes at room temperature. 72 uL of the master mixture was added to column 1 of two separate PCR plates using a 200 uL multi-channel pipettor (Rainin, Cat. #: 17013805). One PCR plate was placed on the SSCRM, with the other plate being placed on a regular solid core ring magnet plate. Both plates were incubated for 7 minutes to allow the magnetic particles to be collected. To mimic inadvertent particle aspiration, wells A1 through D1 were aspirated using a tracking aspiration (removal of liquid as the pipet tip is moving downward) with contact to the left side of the wells as the pipet tip was lowered to the bottom of the well, referred to as the TSW (Tracking Side of Well) method. In wells E1 through H1 the liquid was aspirated using a tracking aspiration with no contact to the sides of the wells, referred to as the TDC (Tracking Dead-Center) method. These aspiration procedures were used for all steps in the purification process including ethanol washes and elution. Following supernatant removal, PCR plates were removed from the magnetic plates and washed two times with 150 uL 75% ethanol (from a master mix of 75 mL of Ethanol (98%) (Sigma, cat. #E7023) and 25 mL of nuclease free water (Sigma, cat. #W4502). The wash procedure was the same as described under 2). Following the final ethanol wash, the particles were allowed to dry with the PCR plates on the magnetic plates for 7 minutes. Lambda DNA was eluted in 50 uL of 1× Tris-EDTA (as prepared above). DNA concentration in the eluted samples was measured using a DeNovix Model DS-11 Series spectrophotometer. Data was recorded in Table 4 below.

C. Data and Analysis

1. Analysis

TABLE 4

Recovery of lambda DNA from Eppendorf PCR plates - SSCRM and Solid-Core Ring Magnet Plate.

| | SSCRM | | | Solid-Core Ring Magnet Plate | |
|---|---|---|---|---|---|
| Aspiration Method | Well Location | Lambda DNA Conc. (ng/uL) | Aspiration Method | Well Location | Lambda DNA Conc. (ng/uL) |
| TSW* | A1 | 44.7 | TSW* | A1 | 38.6 |
| TSW* | B1 | 42.6 | TSW* | B1 | 39.2 |
| TSW* | C1 | 43.2 | TSW* | C1 | 35.2 |
| TSW* | D1 | 44.1 | TSW* | D1 | 39.8 |
| TDC** | E1 | 42.7 | TDC** | E1 | 41.5 |
| TDC** | F1 | 43 | TDC** | F1 | 43.5 |
| TDC** | G1 | 40.9 | TDC** | G1 | 44.6 |
| TDC** | H1 | 42.6 | TDC** | H1 | 45.2 |
| TSW* | A2 | 42.6 | TSW* | A2 | 37.2 |
| TSW* | B2 | 43.8 | TSW* | B2 | 39.1 |
| TSW* | C2 | 44.2 | TSW* | C2 | 41.1 |

TABLE 4-continued

Recovery of lambda DNA from Eppendorf PCR plates - SSCRM and Solid-Core Ring Magnet Plate.

| SSCRM | | | Solid-Core Ring Magnet Plate | | |
|---|---|---|---|---|---|
| Aspiration Method | Well Location | Lambda DNA Conc. (ng/uL) | Aspiration Method | Well Location | Lambda DNA Conc. (ng/uL) |
| TSW* | D2 | 41.6 | TSW* | D2 | 40.2 |
| TDC** | E2 | 40.8 | TDC** | E2 | 43.7 |
| TDC** | F2 | 43.2 | TDC** | F2 | 45.2 |
| TDC** | G2 | 41 | TDC** | G2 | 45.1 |
| TDC** | H2 | 45 | TDC** | H2 | 43.9 |

*TSW - Aspirate while tracking down side of well
**TDC- Aspirate while tracking dead-center to bottom of well without contact with sides of well 2. Analysis

| | |
|---|---|
| Mean of SSCRM plate - TSW Method: | 43.4 ng/ul |
| Mean of SSCRM plate - TDC Method: | 42.4 ng/ul |
| Mean of Solid-Core Ring plate - TSW Method: | 38.8 ng/ul |
| Mean of Solid-Core Ring plate - TDC Method: | 44.1 ng/ul |
| % Difference mean of SSCRM plate TSW method vs mean of solid-core ring plate TSW method: | 10.5 |
| % Difference mean of SSCRM plate TDC method vs mean of solid-core ring TDC method: | −3.8 |
| STD Dev of SSCRM plate-TSW Method: | 1.0 ng/ul |
| STD Dev of SSCRM plate- TDC Method: | 1.4 ng/ul |
| STD Dev of Solid-Core Ring plate - TSW Method: | 1.9 ng/ul |
| STD Dev of Solid-Core Ring plate- TDC Method: | 1.3 ng/ul |

CONCLUSION

Based on the analysis of the data use of the slotted/discontinuous cavity wall solid-core ring magnet resulted a 10.5% increase in lambda DNA recovery when using the TSW tracking aspiration method, namely using the gap in the cavity wall along the side of the cavity wall, as compared to the continuous cavity wall solid-core ring magnet plate for the Eppendorf PCR plate.

In addition, no significant difference in lambda DNA recovery was observed between the slotted/discontinuous cavity wall solid core magnet plate and the continuous cavity wall solid core magnet plate using the TDC method to aspirate-while-tracking to bottom of well without contact with the sides of well, indicating no reduction in performance when using the slotted plate design.

In conclusion, the slotted/discontinuous cavity wall solid-core ring magnet plate design will mitigate inadvertent loss of magnetic particles due to variations in pipetting techniques for manual users of magnetic particle based workflows.

The relevant teachings of all the references, patents and/or patent applications cited herein are incorporated herein by reference in their entirety.

The following applications are related to the invention described herein: U.S. Application No. (not yet assigned), entitled "Discontinuous Hollow Core Magnet" by Olaf Stelling, filed (on even date herewith); U.S. application Ser. No. 15/497,858, entitled "Solid-Core Ring-Magnet" by Olaf Stelling, filed Apr. 26, 2017; U.S. application Ser. No. 14/515,256, entitled "SOLID-CORE RING-MAGNET" by Olaf Stelling, filed Oct. 15, 2014. The entire teachings of the above application are incorporated herein by reference.

While this invention has been particularly shown and described with references to preferred embodiments thereof, it will be understood by those skilled in the art that various changes in form and details may be made therein without departing from the scope of the invention encompassed by the appended claims.

What is claimed is:

1. A magnet for use in isolating macromolecules from a mixture in a vessel of a magnet plate system having a top plate adapted to receive a plurality of magnets, at least one support, a base plate, at least one spring that communicates with the top plate and the base plate; and a support plate to support the plurality of magnets, wherein when in use, the macromolecules adhere to paramagnetic beads to form a complex, wherein the magnet comprises:
    a) a core comprising a solid inner mass having a first end having a first surface, and a second end having a second surface;
    b) one or more cavities extending into the core at the first end, the second end, or both; wherein the one or more cavities each have a cavity wall and at least a portion of the cavity wall comprises one or more segments and one or more gaps to form a discontinuous cavity wall; and
    c) at least one side wall, wherein the side wall is in communication with at least a portion of the first end and at least a portion of the second end;
wherein the magnet is configured to form a magnetic field within the vessel and adapted to be received by the top plate in the magnet plate system.

2. The magnet of claim 1, wherein the discontinuous cavity wall forms a discontinuous magnetic pattern in the vessel such that, when in use, the complex of macromolecules and paramagnetic beads aggregate in a discontinuous pattern according to said magnetic field and the complex can be separated from the mixture.

3. The magnet of claim 1, wherein the discontinuous cavity wall has one, two, three or four segments separated by one, two, three or four gaps, respectively.

4. The magnet of claim 1, wherein the magnet is made from one or more pieces.

5. The magnet of claim 1, wherein at least a portion of the side wall is shaped to form a ring, oval, square, rectangular, triangular, diamond, or an irregular shape.

6. The magnet of claim 1, wherein the discontinuous cavity wall surrounds the cavity between the first surface and at least a portion of the inner core, or between the second surface and at least a portion of the inner core.

7. A magnet for use in isolating macromolecules from a mixture in a vessel of a magnet plate system having a top plate adapted to receive a plurality of magnets, at least one support, a base plate, at least one spring that communicates with the top plate and the base plate; and a support plate to support the plurality of magnets, wherein when in use, the macromolecules adhere to paramagnetic beads to form a complex, wherein the magnet comprises:
  a) a core comprising a solid inner mass having a first end and a second end; and
  b) one or more cavities extending into the core at the first end, the second end, or both; wherein the one or more cavities each have a cavity wall and at least a portion of the cavity wall comprises one or more segments and one or more gaps to form a discontinuous cavity wall;
wherein the magnet is configured to form a magnetic field within the vessel and adapted to be received by the top plate in the magnet plate system.

8. The magnet of claim 7, wherein the discontinuous cavity wall forms a discontinuous magnetic pattern in the vessel such that, when in use, the complex of macromolecules and paramagnetic beads aggregate in a discontinuous pattern according to said magnetic field and the complex can be separated from the mixture.

9. The magnet of claim 7, wherein the discontinuous cavity wall has one, two, three or four segments separated by one, two, three or four gaps, respectively.

10. The magnet of claim 7, wherein at least the portion of the discontinuous cavity wall is shaped to form a discontinuous ring, oval, square, rectangular, triangular, diamond, or an irregular shape.

11. The magnet of claim 7, wherein the magnet is made from one or more pieces.

12. The magnet of claim 7, further comprising at least one side wall, wherein the side wall is in communication with the first end and the second end, wherein the first end of the solid core has a first surface, and the second end of the solid core has a second surface, and a magnet volume enclosed between the first surface, the second surface, and the side wall forms a cylinder.

13. The magnet of claim 7, wherein the first end of the solid core has a first surface, and the second end of the core has a second surface, and the discontinuous cavity wall surrounds the cavity between the first surface and at least a portion of the inner core, or between the second surface and at least a portion of the inner core.

14. A magnet for use in isolating macromolecules from a mixture in a vessel of a magnet plate system having a top plate adapted to receive a plurality of magnets, at least one support, a base plate, at least one spring that communicates with the top plate and the base plate; and a support plate to support the plurality of magnets, wherein when in use, the macromolecules adhere to paramagnetic beads to form a complex, wherein the magnet comprises:
  a) a core comprising a solid inner mass having a first end, and a second end; and
  b) one or more cavities extending into the core at the first end, the second end, or both; wherein the one or more cavities each have a discontinuous cavity wall and at least a portion of the discontinuous cavity wall comprises one or more segments and one or more gaps
wherein the magnet is configured to form a magnetic field within the vessel and adapted to be received by the top plate in the magnet plate system.

15. A kit for use in isolating macromolecules from a mixture in a vessel of a magnet plate system having a top plate adapted to receive a plurality of magnets, at least one support, a base plate, at least one spring that communicates with the top plate and the base plate; and a support plate to support the plurality of magnets, wherein when in use, the macromolecules adhere to paramagnetic beads to form a complex, wherein the kit comprises:
  a) a magnet that comprises:
    i) a core comprising a solid inner mass having a first end and a second end; and
    ii) ene or more cavities extending into the core at the first end, the second end, or both; wherein the one or more cavities each have a cavity wall and at least a portion of the cavity wall comprises one or more segments and one or more gaps to form a discontinuous cavity wall;
  wherein the magnet is configured to form a magnetic field within the vessel; wherein the magnet is adapted to be received by the top plate in the magnet plate system, and wherein, when in use, the vessel is placed on the magnet or is shaped to fit within the one or more cavities.

16. The kit of claim 15, wherein the discontinuous cavity wall forms a discontinuous magnetic pattern in the vessel such that, when in use, the complex of macromolecules and paramagnetic beads aggregate in a discontinuous pattern according to said magnetic field and the complex can be separated from the mixture.

17. The kit of claim 15, wherein the magnet is made from one or more pieces.

18. The kit of claim 15, wherein at least the portion of the discontinuous cavity wall is shaped to form a discontinuous ring, oval, square, rectangular, triangular, diamond, or an irregular shape.

19. The kit of claim 15, wherein the kit further comprises magnetic beads, one or more buffer compositions or both.

20. A magnet plate for use in isolating a macromolecule from a mixture in a vessel, wherein the magnet plate comprises:
  a) at least one magnet, wherein the magnet comprises:
    i) a core comprising a solid inner mass having a first end and a second end; and
    ii) one or more cavities extending into the core at the first end, the second end, or both; wherein the one or more cavities each have a cavity wall and at least a portion of the cavity wall comprises one or more segments and one or more gaps to form a discontinuous cavity wall;
  wherein the magnet is configured to form a magnetic field within the vessel; and
  b) a top plate adapted to receive a plurality of magnets, wherein the top plate is in communication with at least one spring and at least one support;
  c) at least one support having the top end and a bottom end;
  d) at least one spring that communicates with the top plate and a base plate;
  e) a support plate to support the magnet, wherein the support plate is at the top plate; and
  f) the base plate that is in communication with the support and is placed beneath the top plate.

21. The magnet plate system of claim 20, wherein the top plate comprises a plurality of magnet openings to receive the magnets.

\* \* \* \* \*